United States Patent
Gupta et al.

(10) Patent No.: US 9,721,212 B2
(45) Date of Patent: Aug. 1, 2017

(54) EFFICIENT ON-DEVICE BINARY ANALYSIS FOR AUTO-GENERATED BEHAVIORAL MODELS

(71) Applicant: QUALCOMM Incorporated, San Diego, CA (US)

(72) Inventors: Rajarshi Gupta, Sunnyvale, CA (US); Vinay Sridhara, Santa Clara, CA (US); Satyajit Prabhakar Patne, San Diego, CA (US); Mihai Christodorescu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 529 days.

(21) Appl. No.: 14/295,561

(22) Filed: Jun. 4, 2014

(65) Prior Publication Data
US 2015/0356451 A1 Dec. 10, 2015

(51) Int. Cl.
*G06N 5/00* (2006.01)
*G06F 1/00* (2006.01)
*G06N 99/00* (2010.01)
*G06F 21/55* (2013.01)

(52) U.S. Cl.
CPC ......... *G06N 99/005* (2013.01); *G06F 21/552* (2013.01)

(58) Field of Classification Search
CPC .......... G06N 7/005; G06N 5/048; G06N 5/04; G06Q 50/01
See application file for complete search history.

(56) References Cited

U.S. PATENT DOCUMENTS

| 8,499,353 | B2 | 7/2013 | Lockhart et al. |
| 8,584,241 | B1 | 11/2013 | Jenks et al. |
| 2012/0042262 | A1* | 2/2012 | Priyadarshan ..... G06Q 30/0269 715/745 |

(Continued)

OTHER PUBLICATIONS

Bose A., et al., "Behavioral Detection of Malware on Mobile Handsets," MobiSys '08, Jun. 17-20, 2008. pp. 225-238.

(Continued)

*Primary Examiner* — Stanley K Hill
*Assistant Examiner* — Kalpana Bharadwaj
(74) *Attorney, Agent, or Firm* — The Marbury Law Group/Qualcomm

(57) ABSTRACT

Various aspects provide methods implemented by at least one processor executing on a mobile communication device to efficiently identify, classify, model, prevent, and/or correct the non-benign (e.g., performance degrading) conditions and/or behaviors that are related to an application operating on the device. Specifically, in various aspects, the mobile computing device may derive or extract application-specific features by performing a binary analysis of an application and may determine the application's category (e.g., a "games," "entertainment," or "news" category) based on the application-specific features. The mobile computing device may also obtain a classifier model associated with the application's category that includes various conditions, features, behaviors and corrective actions that may be used to quickly identify and correct non-benign behaviors (e.g., undesirable, malicious, and/or performance-degrading behaviors) occurring on the mobile computing device that are related to the application.

18 Claims, 13 Drawing Sheets

(56) References Cited

U.S. PATENT DOCUMENTS

2012/0227105 A1      9/2012  Friedrichs et al.
2014/0129178 A1*     5/2014  Meduna .................. G06F 17/00
                                                         702/189
2014/0279583 A1*     9/2014  Surdeanu ............. G06Q 50/184
                                                         705/310

OTHER PUBLICATIONS

Shalaginov A., et al., "Automatic rule-extraction for malware detection on mobile devices," 2013, 164 pages.

* cited by examiner

EFFICIENT ON-DEVICE BINARY ANALYSIS FOR AUTO-GENERATED BEHAVIORAL MODELS

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications.

To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, identifying and correcting the conditions and/or mobile device behaviors that may negatively impact the mobile device's long term and continued performance and power utilization levels is beneficial to consumers.

SUMMARY

Various aspects provide methods, devices, and non-transitory processor-readable storage media for generating data models in a mobile computing device in response to deriving a set of features specific to an application based on a lightweight binary analysis of the application. In some aspects, the set of application-specific features may be generated by extracting a set of features related to the application based on the lightweight binary analysis of the application, comparing the extracted set of features with a list of generic features, and removing any feature in the set of extracted features that matches a feature in the list of generic features to produce the set of application-specific features.

Some aspect methods may include categorizing the application based on the set of application-specific features and obtaining a classifier model based on the category of the application. Categorizing the application based on the set of application-specific features may include classifying behaviors of the application with a generic classifier model, determining whether there is a consistent history of behavior classification determinations with low-confidence values associated with the generic classifier model based on the classified behaviors, deriving a set of features specific to the application based on a lightweight binary analysis of the application performed in response to determining that there is a consistent history of behavior classification determinations with low-confidence values associated with the generic classifier model, and categorizing the application based on the set of application-specific features derived from the lightweight binary analysis of the application performed in response to determining that there is a consistent history of behavior classification determinations with low-confidence values associated with the generic classifier model.

In some aspects, obtaining a classifier model based on the category of the application may include comparing the category of the application with a list of categories associated with previously generated classifier models, determining whether the category of the application matches a category included in the list of categories, obtaining a previously generated classifier model associated with a matching category included in the list of categories in response to determining that the category of the application matches the matching category, and obtaining a new classifier model based on the set of application-specific features in response to determining that the category of the application does not match a category in the list of categories.

In some aspects, the methods may include observing behaviors of the set of application-specific features, generating a behavior vector for the application based on the observed behaviors, and applying the behavior vector to the classifier model to detect non-benign behavior on the mobile computing device related to the application.

In some aspects, the methods may include identifying features related to the application that are occurring on the mobile computing device based on the observed behaviors, determining whether there is a non-trivial difference between the features related to the application that are occurring on the mobile computing device and the set of application-specific features included in the classifier model, and obtaining a different classifier model based on the features related to the application that are occurring on the mobile computing device in response to determining that there is a non-trivial difference between the features related to the application that are occurring on the mobile computing device and the set of application-specific features included in the classifier model.

In some aspects, applying the behavior vector to the classifier model to detect non-benign behavior on the mobile computing device related to the application may include applying the behavior vector to the classifier model to generate a behavior classification determination and a confidence value associated with the behavior classification determination. In such aspects, the methods may include determining whether the confidence value associated with the behavior classification determination is less than a low-confidence threshold value, determining whether there is a consistent history of behavior classification determinations with low-confidence values associated with the classifier model in response to determining that the confidence value associated with the behavior classification determination is less than the low-confidence threshold value, obtaining a refined classifier model associated with the category of the application in response to determining that there is not a consistent history of behavior classification determinations with low-confidence values associated with the classifier model, and performing an analysis of the set of application-specific features to determine a new category for the application and obtaining another classifier model based on the new category of the application in response to determining that there is a consistent history of behavior classification determinations with low-confidence values associated with the classifier model.

Various aspects may include a mobile computing device configured with processor-executable instructions to perform operations of the methods described above. Various aspects may include a mobile computing device having means for performing functions of the operations of the methods described above. Various aspects may include non-transitory processor-readable media on which are stored processor-executable instructions configured to cause a processor of a mobile computing device to perform operations of the methods described above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

DETAILED DESCRIPTION

Figure 1:
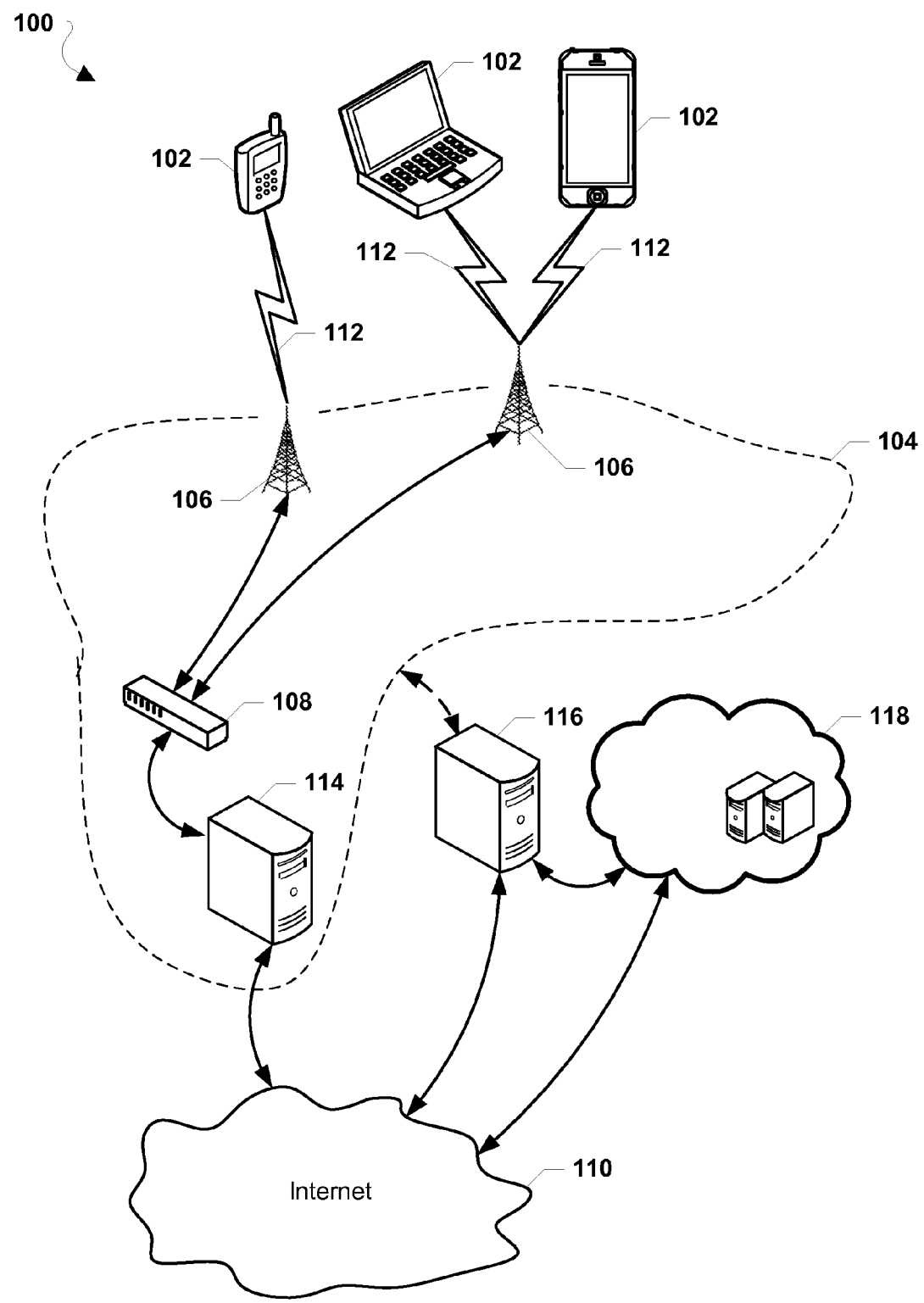
FIG. 1 is a communication system block diagram illustrating network components of an example telecommunication system that is suitable for use with various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important. While the various aspects are particularly useful for mobile computing devices that have limited resources and run on battery power, such as smartphones, the aspects are generally useful in any electronic device that includes a processor and executes application programs.

The term "performance degradation" is used herein to refer to a wide variety of undesirable mobile device operations and characteristics, such as longer processing times, slower real time responsiveness, lower battery life, loss of private data, malicious economic activity (e.g., sending unauthorized premium SMS message), denial of service (DoS), poorly written or designed software applications, malicious software, malware, viruses, fragmented memory, operations relating to commandeering the mobile device or utilizing the phone for spying or botnet activities, etc. Also, applications and conditions that degrade performance for any of these reasons are referred to herein as "not benign."

In overview, various aspects include methods for managing the implementation of behavior classifier models on mobile computing devices that include and/or test features specific to one or more applications operating on the devices and are used to quickly and efficiently identify software-application behaviors that are not benign (e.g., malicious, poorly written, incompatible with the device, performance degrading, etc.) or using data improperly (e.g., reading address book data and sending it to an unknown server).

Generally, the performance, power efficiency, and security of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Mobile computing devices are resource constrained systems that have relatively limited processing, memory, and energy resources. Modern mobile computing devices are also complex systems having a large variety of factors that may contribute to the degradation in performance and power utilization levels of the mobile computing device over time. Examples of factors that may contribute to performance degradation include poorly designed software applications, malware, viruses, fragmented memory, and background processes. Due to the number, variety, and complexity of these factors, it is often not feasible to evaluate all of the various components, behaviors, processes, operations, conditions, states, or features (or combinations thereof) that may degrade performance and/or power utilization levels of the complex yet resource-constrained systems of modern mobile computing devices. As such, it is difficult for users, operating systems, or application programs (e.g., anti-virus software, etc.) to accurately and efficiently identify the sources of such problems. As a result, mobile computing device users currently have few remedies for preventing the degradation in performance and power utilization levels of a mobile computing device over time, or for restoring an aging mobile computing device to its original performance and power utilization levels.

Currently, solutions exist for modeling the behavior of an application program executing on a computing device, and these solutions may be used along with machine learning techniques to determine whether a software application is not benign. However, these solutions are not suitable for use on mobile computing devices because they require evaluating a very large corpus of behavior information, do not generate behavior models dynamically, do not intelligently prioritize the features in the behavior model, are limited to evaluating an individual application program or process, and/or require the execution of computationally-intensive processes in the mobile computing device. As such, implementing or performing these existing solutions in a mobile computing device may have a significant negative and/or user-perceivable impact on the responsiveness, performance, or power consumption characteristics of the mobile computing device.

For example, a computing device may be configured to use an existing machine learning-based solution to access and use a large corpus of training data, derive a model that takes as input a feature vector, and use this model to determine whether a software application of the computing device is not benign. However, such a solution does not generate a full classifier model (i.e., a robust data or behavior model) that describes the large corpus of behavior information in a format or information structure (e.g., finite state machine, etc.) that may be used by a mobile computing device to quickly generate a lean classifier model. For at least this reason, such a solution does not allow a mobile computing device to generate a lean classifier model that includes, tests, or accounts for features that are particularly relevant to the performance and/or operation of the mobile computing device. In addition, this solution does not allow a mobile computing device to generate a lean classifier model that intelligently identifies or prioritizes the features in accordance to their relevance to classifying a specific behavior in the specific mobile computing device in which the model is used. For these and other reasons, such a solution cannot be used by a mobile computing device processor to quickly and efficiently identify, analyze, or classify a complex mobile computing device behavior without having a significant negative or user-perceivable impact on the responsiveness, performance, or power consumption characteristics of the mobile computing device.

Additionally, because modern mobile computing devices are highly configurable and complex systems, the features that are most important for determining whether a particular mobile computing device behavior is not benign (i.e., undesirable, malicious, suspicious, or performance-degrading) may be different in each mobile computing device. Further, a different combination of features may require monitoring and/or analysis in each mobile computing device in order for that mobile computing device to quickly and efficiently determine whether a particular behavior is benign or not benign. Yet, the precise combination of features that require monitoring and analysis, and the relative priority or importance of each feature or feature combination, can often only be determined using device-specific information obtained from the specific mobile computing device in which a behavior is to be monitored or analyzed. For these and other reasons, behavior models generated in any computing device other than the specific device in which they are used cannot include information that identifies the precise combination of features that are most important to classifying a behavior in that device.

Many current behavior modeling solutions implement a "one-size-fits-all" static approach to modeling the behaviors of a computing device, and are therefore not suitable for use in mobile computing devices. That is, these solutions typically generate the behavior models so that they are generic and may be used in many computing devices and/or with a variety of different hardware and software configurations. As such, these generic behavior models often include/test a very large number of features, many of which are not relevant to (and thus cannot be used for) identifying, analyzing, or classifying a behavior in the specific computing device in which they are actually used. In addition, these solutions do not assign relative priorities to features based on their relevance to classifying a specific behavior in the specific mobile computing device in which the model is used. Therefore, these solutions typically require that a computing device apply behavior models that include a large number of disorganized, improperly prioritized, or irrelevant features. Such models are not suitable for use in resource-constrained mobile computing devices because they may cause the mobile computing device processor to analyze a large number of features that are not useful for identifying a cause or source of the mobile computing device's degradation over time. As such, these existing solutions are not suitable for use in complex-yet-resource-constrained mobile computing devices.

Some recent solutions have proposed methods for providing malware protection for individual applications operating on a mobile computing device by extracting application-specific features and/or application-specific rules for each application and using those features and/or rules to generate classifier models used to detect non-benign behavior associated with the individual applications. In particular, these solutions propose generating a unique classifier model for each application based on that application's extracted features. While these solutions may provide protection against non-benign behaviors, the process of generating a new classifier model for each application installed on the mobile computing device may require considerable processing and power resources. Given the limited resources available on most mobile computing devices, generating a new classifier model for each application is very costly and often impractical.

To address such limitations in conventional approaches for providing malware protection, the various aspects leverage the fact that a mobile computing device may use the same classifier model to monitor and classify behaviors of applications with similar features/characteristics (sometimes referred to herein as a "category" of applications). Specifically, rather than generating a new classifier model for each application installed on a mobile computing device, a mobile computing device implementing an aspect method may attempt to obtain a previously generated classifier model associated with each application's category, thereby potentially saving considerable time, power, and processing resources while maintaining protection against non-benign behaviors related to the applications at least comparable to current solutions.

Thus, various aspects provide methods implemented by at least one processor executing on a mobile communication device to efficiently identify, classify, model, prevent, and/or correct the non-benign (e.g., performance degrading) conditions and/or behaviors that are related to an application operating on the device. Specifically, in various aspects, the mobile computing device may derive or extract application-specific features by performing a binary analysis of an application and may determine the application's category (e.g., a "games," "entertainment," or "news" category) based on the application-specific features. The mobile computing device may also obtain a classifier model associated with the application's category that includes various conditions, features, behaviors, and corrective actions that may be used to quickly identify and correct non-benign behaviors (e.g., undesirable, malicious, and/or performance-degrading behaviors) occurring on the mobile computing device that are related to the application.

In some aspects, a classifier model (e.g., a full or lean classifier model) may be a finite state machine description or representation of a large corpus of behavior information. The finite state machine may include information that is suitable for expression as a plurality of nodes, boosted decision trees, or decision stumps that each incorporates one or more features on the mobile computing device related to an application operating on the device. For example, the finite state machine may be an information structure that may be expressed as a family of boosted decision stumps that collectively identify, describe, test, or evaluate all or many of the features and data points that are relevant to determining whether behavior on the mobile computing device related to a particular application is not benign (e.g., malicious or contributing to degradation in performance of the mobile computing device over time).

In some aspects, a server may send the mobile computing device a full classifier model, which may be an information structure that includes finite state machine and/or family of boosted decision stumps, etc. The mobile computing device may be configured to receive and use the full classifier model to generate lean classifier models or a family of lean classifier models of varying levels of complexity (or "leanness"). To accomplish this, the mobile computing device may prune or cull the robust family of boosted decision trees included in the full classifier model received from the server to generate a lean classifier model that includes a reduced number of boosted decision trees and/or evaluates a limited number of test conditions or features, including features related to one or more applications operating on the mobile computing device. The mobile computing device may then use these locally generated, lean classifier models to perform real-time behavior monitoring and analysis operations and identify a source or a cause of an non-benign behavior (e.g., malicious or performance-degrading) related to the one or more applications operating on the mobile computing device.

By utilizing full classifier models that describe or express a large corpus of behavior information as a finite state machine, decision nodes, decision trees, or other similar information structures that can be modified, culled, augmented, or otherwise used to generate lean classifier models, the mobile computing device may be able to generate lean classifier models quickly, efficiently, and without accessing training data or further communicating with the server, the central database, or the cloud network/server. This significantly reduces the mobile computing device's dependence on the network, and improves the performance and power consumption characteristics of the mobile computing device.

By generating the lean classifier models locally in the mobile computing device to account for features specifically related to one or more applications operating on the mobile computing device, the various aspects allow the mobile computing device to focus its monitoring operations on the features or factors that are most important for identifying the source or cause of a non-benign (e.g., malicious or performance depredating) mobile computing device behavior related to the one or more applications. This allows the mobile computing device to identify and respond to these non-benign behaviors without causing a significantly negative or user-perceivable change in the responsiveness, performance, or power consumption characteristics of the mobile computing device.

Various aspects may include a comprehensive behavioral monitoring and analysis system for intelligently and efficiently identifying, preventing, and/or correcting the conditions, factors, and/or behaviors that cause non-benign behaviors and/or performance (e.g., behaviors causing degraded performance and/or power utilization levels over time). In some aspects, a behavior observer unit, process, daemon, module, or sub-system (herein collectively referred to as a "module" or "unit") of the mobile computing device may instrument or coordinate various application programming interfaces (APIs), registers, counters or other components (herein collectively "instrumented components") at various levels of the mobile computing device system. The observer module may continuously (or near continuously) monitor mobile computing device behaviors related to one or more applications operating on the mobile computing device by collecting behavior information from the mobile computing device.

The mobile computing device may include a behavior analyzer unit, and the behavior observer unit on the mobile computing device may communicate (e.g., via a memory write operation, function call, etc.) the collected behavior information to the behavior analyzer unit. The behavior analyzer unit may receive and use the behavior information to generate behavior vectors, to generate spatial and/or temporal correlations based on the behavior vectors, and to determine whether a particular behavior, condition, subsystem, software application, or process on the mobile computing device related to a specific application is not benign (e.g., suspicious, undesirable, malicious, or performance-degrading). The mobile computing device may then use the results of this analysis to heal, cure, isolate, or otherwise fix or respond to identified problems on the mobile computing device related to the one or more applications, such as by terminating a malware application operating on the mobile computing device that is causing non-benign behavior to occur on the device.

The behavior analyzer unit may also be configured to perform real-time behavior analysis operations, which may include performing, executing, and/or applying data, algorithms, classifiers or models (herein collectively referred to as "classifier models") to the collected behavior information to determine whether a behavior on the mobile computing device related to an application is not benign (e.g., malicious or performance-degrading). Each classifier model may be a behavior model that includes data and/or information structures (e.g., feature vectors, behavior vectors, component lists, etc.) that may be used by a mobile computing device processor to evaluate a specific feature or aspect of a behavior on the mobile computing device related to an application operating on the mobile computing device. Each classifier model may also include decision criteria for monitoring a number of features, factors, data points, entries, APIs, states, conditions, behaviors, applications, processes, operations, components, etc. (herein collectively "features") in the mobile computing device. The classifier models may be preinstalled on the mobile computing device, downloaded or received from a server, received from one or more peripheral devices, generated in the mobile computing device, or any combination thereof. The classifier models may be generated by using crowd sourcing solutions, behavior modeling techniques, machine learning algorithms, etc.

In various aspects, the mobile computing device may perform a light-weight binary analysis of the application's binary file to identify/derive characteristics and/or features of the application (e.g., the application's ability to utilize SMS messaging and how many SMS messages are expected within a certain amount of time). Based on these derived, application-specific features, the mobile computing device may designate the application as belonging to a particular category of applications, such as a "game" application, a "news" application, a "messaging" application, or various other types of applications. For example, the mobile computing device may determine that, in response to deriving features specific to the application via the lightweight binary analysis, the application falls within a "messaging" category because the application's features are predominately related to receiving, sending, and displaying messages.

In some aspects, the mobile computing device may obtain a classifier model that tests/evaluates features specific to an application operating on the mobile computing device based on the determined category of that application. The mobile computing device may also compare the application's category with a list of categories that are associated with previously generated classifier models. In response to determining that the application's category matches a category that is associated with an existing classifier model, the mobile computing device may retrieve that classifier model and may begin using the retrieved classifier model to monitor for non-benign behaviors on the device associated with the application. In response to determining that the application's category does not match a category associated with an existing classifier model, the mobile computing device may generate a classifier model from scratch that includes the application's specific features.

In some aspects, features specific to an application may not include other features that may be generic to various applications (e.g., features related to common APIs, standard input/output, etc.). Thus, in such aspects, the mobile computing device may obtain a classifier model that is specially tailored to monitoring only the features that are highly relevant to the application and that may not otherwise be monitored by other, more generic classifier models.

In some aspects, the mobile computing device may perform a lightweight binary analysis to categorize an application based on the application's specific characteristics/features, and the device may request a classifier model from a server that tests/evaluates features related to that application's category. For example, the mobile computing device may determine that an application installed on the device is a "video player" application, request a classifier model from the server to account for the features specific to that application (e.g., coding/decoding video, video playback, etc.), and utilize the classifier model received from the server to begin monitoring for non-benign behaviors on the mobile computing device related to the application.

In some aspects, the mobile computing device may receive from the server a large or full classifier model that addresses features for various mobile computing devices and various applications and types of applications. The behavior analyzer unit and/or a classifier unit operating on the mobile computing device may generate from the full classifier a lean classifier model that includes relevant features for monitoring malicious behavior on the device. The behavior analyzer unit on the mobile computing device may also identify and modify the lean classifier model to include tests/evaluations for one or more features determined to be related to the application (or type of application) operating on the mobile computing device, thereby enabling the behavior observer unit on the device to focus on observing, analyzing, and classifying behaviors of features on the mobile computing device that are particularly relevant to the application executing on the device.

In some aspects, the mobile computing device may update/refine a classifier model currently used to classify behaviors related to the application based on the actual behaviors on the mobile computing device related to the application over time. In other words, the mobile computing device may initially obtain a classifier model to classify behaviors related to particular features of the application based on a initial categorization of the application (e.g., a "games"-type application), but in operation, the application may exhibit or cause behavior that deviates from the expected features. Thus, in response to determining that the application-specific features monitored using the current classifier model differ from features associated with application's actual operations, the mobile computing device may obtain or generate a different classifier model that may be used to monitor actual behaviors associated with the application more effectively.

In some aspects, the mobile computing device may monitor whether a classifier model used to monitor an application's specific features consistently yields behavior classification determinations (e.g., benign or not benign) that have an unacceptably low confidence, which may indicate that the application category associated with the current classifier model used to monitor the application's behavior (e.g., a classifier model for a "games" application) is inappropriate. In response to determining that the current classifier model consistently produces low-confidence behavior determinations, the mobile computing device may perform another lightweight binary analysis of the application to determine a new category for the application. The mobile computing device may obtain or generate a new classifier model based on the application's newly determined category in order to increase the confidence of behavior determinations related to the application.

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile computing devices 102 (e.g., cell phones, laptops, tablets, etc.) and other network destinations, such as via telephone land lines (e.g., a POTS network, not shown) and the Internet 110. Communications between the mobile computing devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include a server 116 connected to the telephone network 104 and to the Internet 110. The connection between the server 116 and the telephone network 104 may be through the Internet 110 or through a private network (as illustrated by the dashed arrows). The server 116 may also be implemented as a server within the network infrastructure of a cloud service provider network 118. Communication between the server 116 and the mobile computing devices 102 may be achieved through the telephone network 104, the Internet 110, a private network (not illustrated), or any combination thereof.

The server 116 may send classifier models (e.g., full or lean classifiers) to the mobile computing devices 102, which may receive and use the classifier models to identify non-benign (e.g., suspicious, malicious, or performance-degrading) mobile computing device behaviors, software applications, processes, etc. that are related to one or more applications operating on the mobile computing devices 102. The server 116 may also send classification and modeling information to the mobile computing devices 102 to replace, update, create and/or maintain mobile computing device classification models related to those one or more applications. In a further aspect, the mobile computing devices 102 may be configured to use the collected behavioral, state, classification, modeling, success rate, and/or statistical information to generate, update, or refine the classifier models (or data/behavior models) to include a further targeted and/or reduced subset of features related to one or more applications operating on the mobile computing devices 102.

In another aspect, the mobile computing devices 102 may receive and use full classifier models from the server 116 to generate lean classifier models that are suitable for use in identifying non-benign (e.g., suspicious, malicious, or performance-degrading) mobile computing device behaviors, software applications, processes, etc. occurring on the mobile computing device 102 that are related to one or more applications operating on the mobile computing devices 102.

Figure 2:
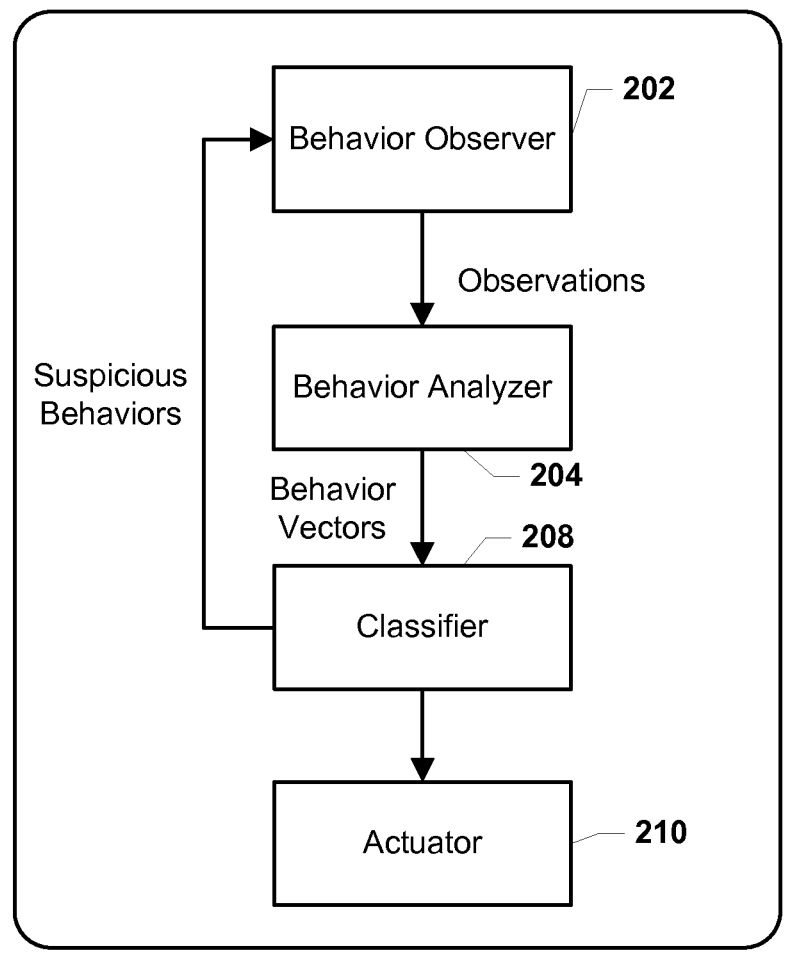
FIG. 2 is a block diagram illustrating example logical components and information flows in a mobile computing device configured to determine whether a particular mobile computing device behavior is not benign according to various aspects.

FIG. 2 illustrates example logical components and information flows in some aspects mobile computing device 102 (e.g., as described with reference to FIG. 2) configured to determine whether a particular mobile computing device behavior, software application, or process is non-benign (e.g., undesirable, malicious, suspicious, and/or performance-degrading). With reference to FIGS. 1-2 and in the example illustrated in FIG. 2, the mobile computing device 102 may include a behavior observer unit 202, a behavior analyzer unit 204, a classifier unit 208, and an actuator unit 210. In some aspects, the classifier unit 208 may be implemented as part of the behavior analyzer unit 204. In some aspects, the behavior analyzer unit 204 may be configured to generate one or more classifier units 208, each of which may include one or more classifiers.

Each of the units 202-210 may be implemented in software, hardware, or any combination thereof. In various aspects, the units 202-210 may be implemented within parts of the operating system (e.g., within the kernel, in the kernel space, in the user space, etc.), within separate programs or applications, in specialized hardware buffers or processors, or any combination thereof. In some aspects, one or more of the units 202-210 may be implemented as software instructions executing on one or more processors of the mobile computing device 102.

The behavior observer unit 202 may be configured to instrument or coordinate application programming interfaces (APIs) at various levels/units of the mobile computing device, and monitor/observe mobile computing device operations and events (e.g., system events, state changes, etc.) at the various levels/units via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer unit 204. In various aspects, the generated observations may be stored as a behavior vector and/or in an API log file or structure.

The behavior observer unit 202 may monitor/observe mobile computing device operations and events by collecting information pertaining to library application programming interface (API) calls in an application framework or run-time libraries, system call APIs, file-system and networking sub-system operations, device (including sensor devices) state changes, and other similar events. The behavior observer unit 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer unit 202 may also monitor data network activity, which may include types of connections, protocols, port numbers, server/client that the device is connected to, the number of connections, volume or frequency of communications, etc. The behavior observer unit 202 may monitor phone network activity, which may include monitoring the type and number of calls or messages (e.g., SMS, etc.) sent out, received, or intercepted (e.g., the number of premium calls placed).

The behavior observer unit 202 may also monitor the system resource usage, which may include monitoring the number of forks, memory access operations, number of files open, etc. The behavior observer unit 202 may monitor the state of the mobile computing device, which may include monitoring various factors, such as whether the display is on or off, whether the device is locked or unlocked, the amount of battery remaining, the state of the camera, etc. The behavior observer unit 202 may also monitor inter-process communications (IPC) by, for example, monitoring intents to crucial services (browser, contracts provider, etc.), the degree of inter-process communications, pop-up windows, etc.

The behavior observer unit 202 may also monitor/observe driver statistics and/or the status of one or more hardware components, which may include cameras, sensors, electronic displays, Wi-Fi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer unit 202 may also monitor/observe one or more hardware counters that denote the state or status of the mobile computing device and/or mobile computing device sub-systems. A hardware counter may include a special-purpose register of the processors/cores that is configured to store a count or state of hardware-related activities or events occurring in the mobile computing device.

The behavior observer unit 202 may also monitor/observe actions or operations of software applications, software downloads from an application download server (e.g., Apple® App Store server), mobile computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth®, WiFi, etc.), content of text-based communications, content of recorded audio files, phonebook or contact information, contacts lists, etc.

The behavior observer unit 202 may monitor/observe transmissions or communications of the mobile computing device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer unit 202 may monitor/observe usage of and updates/changes to compass information, mobile computing device settings, battery life, gyroscope information, pressure sensors, magnet sensors, screen activity, etc. The behavior observer unit 202 may monitor/observe notifications communicated to and from a software application (AppNotifications), application updates, etc. The behavior observer unit 202 may monitor/observe conditions or events pertaining to a first software application requesting the downloading and/or install of a second software application. The behavior observer unit 202 may monitor/observe conditions or events pertaining to user verification, such as the entry of a password, etc.

The behavior observer unit 202 may also monitor/observe conditions or events at multiple levels of the mobile computing device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile computing device before establishing radio communication links or transmitting information, dual/multiple subscriber identity unit (SIM) cards, Internet radio, mobile phone tethering, offloading data for computations, device state communications, the use as a game controller or home controller, vehicle communications, mobile computing device synchronization, etc. Radio level observations may also include monitoring the use of radios (WiFi, WiMax, Bluetooth®, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile computing device. For example, the mobile computing device processor may be configured to determine whether the phone is in a holster (e.g., via a magnet sensor configured to sense a magnet within the holster) or in the user's pocket (e.g., via the amount of light detected by a camera or light sensor). Detecting that the mobile computing device is in a holster may be relevant to recognizing suspicious behaviors, for example, because activities and functions related to active usage by a user (e.g., taking photographs or videos, sending messages, conducting a voice call, recording sounds, etc.) occurring while the mobile computing device is holstered could be signs of nefarious processes executing on the device (e.g., to track or spy on the user).

Other examples of sensor level observations related to usage or external environments may include, detecting near-field communications (NFC), collecting information from a credit card scanner, barcode scanner, or mobile tag reader, detecting the presence of a universal serial bus (USB) power charging source, detecting that a keyboard or auxiliary device has been coupled to the mobile computing device, detecting that the mobile computing device has been coupled to a peripheral device and/or another mobile computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile computing device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile computing device, etc.

The behavior observer unit 202 may be configured to generate behavior vectors that include a concise definition of the observed behaviors. Each behavior vector may succinctly describe observed behavior of the mobile device, software application, or process in a value or vector data-structure (e.g., in the form of a string of numbers, etc.). A behavior vector may also function as an identifier that enables the mobile device system to quickly recognize, identify, and/or analyze mobile device behaviors. In some aspects, the behavior observer unit 202 may generate a behavior vector that includes series of numbers, each of which signifies a feature or a behavior of the mobile device. For example, numbers included in the behavior vector may signify whether a camera of the mobile device is in use (e.g., as zero or one), how much network traffic has been transmitted from or generated by the mobile device (e.g., 20 KB/sec, etc.), how many internet messages have been communicated (e.g., number of SMS messages, etc.), etc.

To reduce the number of factors monitored to a manageable level, in some aspects, the behavior observer unit 202 may perform coarse observations by monitoring/observing an initial set of behaviors or factors that are a small subset of all factors that could contribute to the mobile computing device's degradation. In various aspects, the behavior observer unit 202 may receive the initial set of behaviors and/or factors from other mobile computing devices, a network server (e.g., the server 116) and/or a component in a cloud service or network (e.g., the cloud service provider network 118). In some aspects, the initial set of behaviors/factors may be specified in data/behavior models received from a server or a cloud service/network. In some aspects, the initial set of behaviors/factors may be specified in a reduced feature model (RFMs).

The behavior analyzer unit 204 and/or classifier unit 208 may receive the observations from the behavior observer unit 202, compare the received information (i.e., observations) with contextual information received from the external units, and identify subsystems, processes, and/or applications associated with the received observations that are contributing to (or are likely to contribute to) the device's degradation over time, or which may otherwise cause problems on the device.

In some aspects, the behavior analyzer unit 204 and/or classifier unit 208 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer unit 204 may be configured to analyze information (e.g., in the form of observations) collected from various units (e.g., the behavior observer unit 202, external units, etc.), learn the normal operational behaviors of the mobile computing device, and generate one or more behavior vectors based the results of the comparisons. The behavior analyzer unit 204 may send the generated behavior vectors to the classifier unit 208 for further analysis.

The classifier unit 208 may receive the behavior vectors and compare them to one or more behavior units to determine whether a particular mobile computing device behavior, software application, or process is not benign (e.g., performance degrading, suspicious, and/or malicious).

In response to determining that a behavior, software application, or process is not benign (e.g., malicious or performance-degrading), the classifier unit 208 may notify the actuator unit 210, which may perform various actions or operations to correct mobile computing device behaviors determined to be not benign (e.g., malicious or performance-degrading) and/or perform operations to heal, cure, isolate, or otherwise fix the identified problem.

In response to determining that a behavior, software application, or process is suspicious, the classifier unit 208 may notify the behavior observer unit 202, which may adjust the granularity of its observations (i.e., the level of detail at which mobile computing device behaviors are observed) and/or change the behaviors that are observed based on information received from the classifier unit 208 (e.g., results of the real-time analysis operations), generate or collect new or additional behavior information, and send the new/additional information to the behavior analyzer unit 204 and/or classifier unit 208 for further analysis/classification. Such feedback communications between the behavior observer unit 202 and the classifier unit 208 enable the mobile computing device 102 to recursively increase the granularity of the observations (i.e., make finer or more detailed observations) or change the features/behaviors that are observed until a source of a suspicious or performance-degrading mobile computing device behavior is identified, until a processing or battery consumption threshold is reached, or until the mobile computing device processor determines that the source of the suspicious or performance-degrading mobile computing device behavior cannot be identified from further increases in observation granularity. Such feedback communications also enable the mobile computing device 102 to adjust or modify the data/behavior models locally in the mobile computing device without consuming an excessive amount of the mobile computing device's processing, memory, or energy resources.

In some aspects, the behavior observer unit 202 and the behavior analyzer unit 204 may provide, either individually or collectively, real-time (or near-real time) behavior analysis of the computing system's behaviors to identify suspicious behavior from limited and coarse observations, to dynamically determine behaviors to observe in greater detail, and to dynamically determine the level of detail required for the observations. In this manner, the behavior observer unit 202 enables the mobile computing device 102 to efficiently identify and prevent problems from occurring on mobile computing devices without requiring a large amount of processor, memory, or battery resources on the device.

Figure 3:
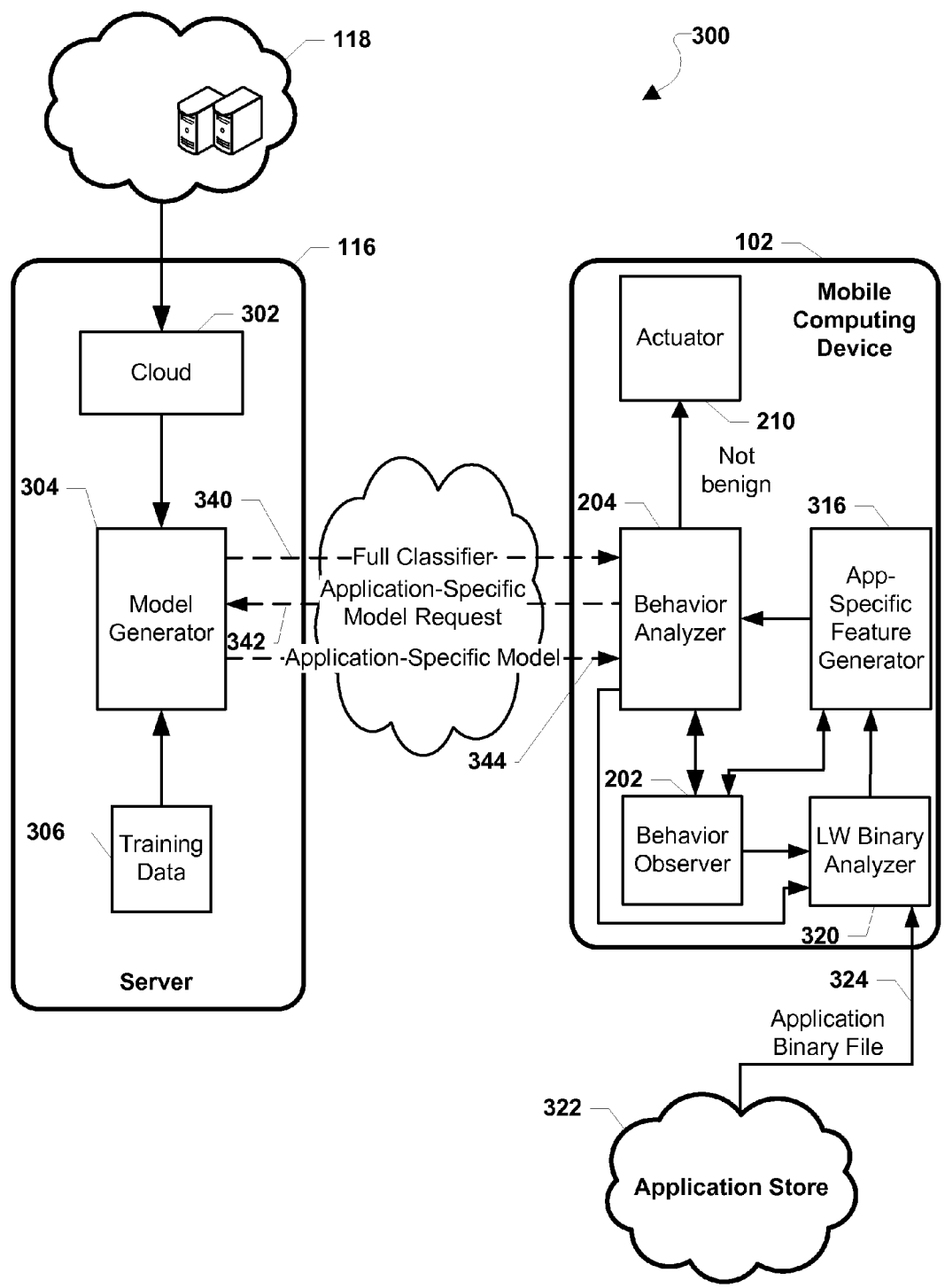
FIG. 3 is a block diagram illustrating example components and information flows in a system that includes a server configured to work in conjunction with a mobile computing device to generate a classifier model and use the classifier model to determine whether a particular mobile computing device behavior related to an application is not benign according to various aspects.

FIG. 3 illustrates example components and information flows in some aspects system 300 that includes a mobile computing device 102 configured to intelligently and efficiently identify non-benign (e.g., malicious or poorly written software applications and/or suspicious or performance-degrading) mobile computing device behaviors related to one or more applications operating on the mobile computing device 102 without consuming an excessive amount of processing, memory, or energy resources of the mobile computing device. In some aspects, the mobile computing device 102 may optionally monitor for non-benign behaviors associated with one or more applications operating on the mobile computing device 102 with assistance from a server 116.

With reference to FIGS. 1-3, in the example illustrated in FIG. 3, the server 116 includes a cloud unit 302, a model generator 304 unit, and a training data unit 306. The mobile computing device 102 includes a behavior observer unit 202, a behavior analyzer unit 204, an actuator unit 210, an application-specific feature generator 316 (labeled in FIG. 3 as "App-Specific Feature Generator"), and a lightweight binary analyzer unit 320 (labeled in FIG. 3 as "LW Binary Analyzer"). In various aspects, the application-specific feature generator 316 and/or the lightweight binary analyzer unit 320 may be included, or implemented as part of, the behavior analyzer unit 204 or as part of a classifier unit 208 (not illustrated in FIG. 3).

In some aspects, the cloud unit 302 may be configured to receive a large amount of information from a cloud service provider network 118 that includes all or most of the features, data points, and/or factors that could contribute to the mobile computing device 102's degradation over time, including features that may be present on/related to various applications that may operate on a mobile computing device (e.g. the mobile computing device 102).

The model generator 304 may use the information received in the cloud unit 302 and training data (e.g., via the training data unit 306) to generate a full or robust classifier model that includes or identifies all or most of the features, data points, and/or factors that could contribute to non-benign behavior on the mobile computing device 102 over time.

In various aspects, the server 116 may be configured to generate the full classifier model by performing, executing, and/or applying machine learning and/or context modeling techniques to behavior information and/or the results of behavior analyses provided by many mobile computing devices or other information received from the cloud service provider network 118. Thus, the server 116 may receive a large number of reports from a plurality of mobile computing devices and may analyze, consolidate or otherwise turn such crowd-sourced information into useable information, particularly behavior models that may be used or accessed by all mobile computing devices. The server 116 may continuously reevaluate existing behavior models as new behavior/analysis reports are received from mobile computing devices, and/or generate new or updated behavior models based on historical information (e.g., collected from prior executions, previous applications of behavior models, etc.), new information, machine learning, context modeling, and detected changes in the available information, mobile computing device states, environmental conditions, network conditions, mobile computing device performance, battery consumption levels, etc.

In some aspects, the model generator 304 may generate the full classifier model to include a finite state machine representation, such as a boosted decision stump or family of boosted decision stumps that can be quickly and efficiently culled, modified or converted into lean classifier models that are suitable for use or execution in a mobile computing device processor. The finite state machine expression or representation may be an information structure that includes test conditions, state information, state-transition rules, and other similar information. In some aspects, the finite state machine expression or representation may be an information structure that includes a large or robust family of boosted decision stumps that each evaluate or test a condition, feature, factor, or aspect of a behavior of the mobile computing device.

In some aspects, the model generator 304 unit may optionally send the full classifier to the mobile computing device 102 (e.g., via a transmission 340), which may be configured to generate lean data/behavior models based on the full model generated in the cloud unit 302. In some aspects, the mobile computing device 102 may be configured to use the full classifier model to generate a family of lean classifier models of varying levels of complexity (or "leanness"). Further, generating the lean data/behavior models on the mobile computing device 102 may include generating one or more reduced feature models (RFMs) that include a subset of the features and data points included in the full model generated in the server 116. In another aspect, the mobile computing device may generate a lean data/behavior model that includes an initial feature set (e.g., an initial reduced feature model) that includes information determined to have a highest probably of enabling the behavior analyzer unit 204 to conclusively determine whether a particular mobile computing device behavior and/or application is not benign (e.g., undesirable, malicious, and/or performance degrading).

In some aspects, the mobile computing device 102 may be configured to cull a family of boosted decision stumps included in the full classifier model received from the server 116 to generate a lean classifier model that includes a reduced number of boosted decision stumps and/or evaluates a limited number of test conditions. This culling of the full boosted decision stumps classifier model may be accomplished by: selecting a boosted decision stump; identifying all other boosted decision stumps that depend upon the same mobile computing device-specific state, feature, behavior, or condition as the selected decision stump (and thus can be applied based upon one determination result); including in the lean classifier model the selected and all identified other boosted decision stumps that depend upon the same mobile computing device-specific state, feature, behavior, or condition; and repeating the process for a limited number of selected boosted decision stumps not already included in the lean classifier model. In this manner, a lean classifier model may be generated that includes all boosted decision stumps that depend upon a limited number of different states, features, behaviors, or conditions. The mobile computing device may then use this locally generated lean classifier model to quickly classify a mobile computing device behavior related to a particular application without consuming an excessive amount of its processing, memory, or energy resources.

Boosted decision stumps are one level decision trees that have exactly one node (and thus one test question or test condition) and a weight value, and thus are well suited for use in a binary classification of data/behaviors. That is, applying a behavior vector to a boosted decision stump results in a binary answer (e.g., Yes or No). For example, if the question/condition tested by a boosted decision stump is "is the frequency of SMS transmissions less than x per min," applying a value of "3" to the boosted decision stump will result in either a "yes" answer (for "less than 3" SMS transmissions) or a "no" answer (for "3 or more" SMS transmissions).

Stumps are efficient because they are very simple and primal (and thus do not require significant processing resources). Stumps are also very parallelizable, and thus many stumps may be applied in parallel/at the same time (e.g., by multiple cores or processors in the mobile computing device).

In some aspects, a behavior analyzer unit 204 of the mobile computing device 102 may generate lean classifier models in the form of decision stumps without accessing training data on the server 116 (e.g., from training data unit 306), thereby eliminating the requirement for the feedback communications between mobile computing device 102 to the server 116. In other words, the behavior analyzer unit 204 may generate and apply lean classifier models without communicating with the cloud or a network to re-train the data, which significantly reduces the mobile computing device's dependence on the cloud (and thus improves performance and power consumption characteristics of the mobile computing device). The behavior analyzer unit 204 may also use boosted decision stumps to classify computing device behavior to identify non-benign (e.g., malicious or performance-degrading) behavior.

In some aspects, the mobile computing device may be configured to perform "joint feature selection and pruning" operations that allow the mobile computing device to: generate lean classifier models on-the-fly without needing access to cloud training data, dynamically reconfigure the classifiers per application to enhance the classification accuracy, and specify a deterministic complexity for each classifier (e.g., O(# of stumps)).

In some aspects, the "joint feature selection and pruning" operations may include performing feature selection operations. For example, the behavior analyzer unit 204 may determine that it needs to generate a lean classifier model that tests two unique features (e.g., F1 and F3), in which case the feature selection operations may include traversing a list of one-hundred boosted decision stumps until the first two unique features (e.g., F1 and F3) are discovered.

The behavior analyzer unit 204 may then test only the features identified by the feature selection operations (e.g., F1 and F3), which may be accomplished by traversing the entire list of one-hundred boosted decision stumps and deleting any stump that tests a different feature/condition (e.g., F5). The remaining boosted decision stumps (i.e., stumps that tests conditions "F1" and "F3") may be used as a lean classifier model without re-training the data. The behavior analyzer unit 204 may apply the behavior information (e.g., in the form of a behavior vector) to each of the remaining boosted decision stumps, compute a weighted average of all the answers received from the remaining stumps, and use the weighted average to determine if a mobile computing device behavior is undesirable or benign.

Once the boosted decision stumps have been generated through the feature selection and pruning process, the behavior analyzer unit 204 may use selected decision stumps as a behavior model that the behavior analyzer unit 204 may compare against current device states, settings, and behaviors. Since decision stumps are binary tests that are independent, the behavior analyzer unit 204 may perform the behavior analysis process of comparing observed behaviors, which may be summarized in a behavior vector, to the model in parallel. Also, since the stumps are very simple (basically binary), the processing to perform each stump may be very simple and thus may be accomplished quickly with less processing overhead. Because each decision stump yields an answer with a weighted value, the behavior analyzer unit 204's ultimate decision regarding whether behaviors are not benign may be determined as the weighted sum of all the results (i.e., a "confidence" value), which may also be a simple calculation.

Thus, in some aspects, the behavior analyzer unit 204 may generate a behavior vector from observations of on-going behaviors on the mobile computing device 102 received from a behavior observer unit 202, and the behavior analyzer unit 204 may apply the behavior vector to boosted decision stumps to determine whether the on-going behaviors on the mobile computing device 102 are not benign.

In some aspects, the mobile computing device 102 may be in communication with an application store 322 (e.g., the Apple® AppStore®) and may receive or download an application binary file 324 from the application store 322, for example, as a result of a user-initiated application purchase. In response to receiving the application binary file 324 on the mobile computing device 102, the lightweight binary analyzer unit 320 may perform a lightweight binary analysis of the application binary file 324 to determine various characteristics and/or capabilities of the application. For example, the lightweight binary analyzer unit 320 may determine the APIs, method calls, functions, and other characteristics that the application may utilize or exhibit during execution.

The lightweight binary analyzer unit 320 may send the determined/derived characteristics and capabilities of the application to the application-specific feature generator 316, and the application-specific feature generator 316 may derive one or more features specific to the application based on the application's determined characteristics, capabilities, and/or abilities. For example, the application-specific feature generator 316 may approximate important features based on the characteristics derived from the binary analysis.

In some aspects, the application-specific feature generator 316 may derive expected features of the application that may be monitored to determine whether the behaviors on the mobile computing device 102 associated with the application are not benign. For example, based on the application's ability to send SMS messages, the application-specific feature generator 316 may derive features related to the application's expected frequency of sending SMS messages. In some particular aspects, the application-specific feature generator 316 may distinguish between features that are specific to and/or unique to the application (i.e., in contrast to features generic to many different kinds of applications), and may only identify those specific features related to the application.

The application-specific feature generator 316 may also analyze the application-specific features related to the application and may determine the application's type/category based on those features. For example, the application-specific feature generator 316 may determine that an application falls within a "shopping" category based on the application's features related to accessing the user's credit card information and negotiating purchases through secured web portals.

Based on the application's particular category, the behavior analyzer unit 204 may obtain a classifier model that tests the application's specific features. In some aspects, the behavior analyzer unit 204 may determine whether a previously generated classifier model related to the application's category (e.g., "games," "news," "shopping," etc.) has already been generated and is stored on the mobile computing device 102 and/or on the server 116. In such aspects, a previously generated classifier model associated with a particular category may include features suitable for monitoring the application's behaviors, and such classifier model may be utilized on the mobile computing device 102 to classify the application's behavior without needing to generate a new classifier model from scratch. In response to determining that there is not a previously generated model that matches the application's category, the behavior analyzer unit 204 may generate a new classifier model that includes/tests the application's specific features.

In other aspects, the behavior analyzer unit 204 may send a request 342 (labeled in FIG. 3 as "Application-Specific Model Request") to the server 116 for a classifier model suitable for testing/monitoring the application's specific features. In such aspects, the request 342 may include information identifying the application, the application's category, the application's characteristics/capabilities, and/or the application's specific features as determined by the application-specific feature generator 316. In response to receiving the request 342, the server 116 may either retrieve a stored classifier model that matches the application's category (as determined either on the mobile computing device 102 or on the server 116) or generate the application-specific classifier model from scratch when there is no previously generated classifier model associated with the application's category. The server 116 may send a response transmission 344 (labeled in FIG. 3 as "Application-Specific Model") that includes the application-specific classifier model to the mobile computing device 102, thereby enabling the behavior observer unit 202 to begin monitoring the application-specific features in the classifier model for non-benign behavior.

In some aspects, the behavior analyzer unit 204 may modify lean classifier models generated as a result of performing the joint feature selection and pruning operations to incorporate/account for specific features related to one or more applications operating on the mobile computing device 102. In such aspects, the lean classifier models that the behavior analyzer unit 204 initially generates from the full classifier model received from the server 116 may not adequately represent the features and behaviors related to one or more applications operating on the mobile computing device 102. For example, the full classifier model received from the server 116 may only include a small number of behavior vectors/models related to applications within a "games" or "video player" category. Because the mobile computing device 102 may not initially include a particular application, the behavior analyzer unit 204 may initially generate a lean classifier model without regard to features that may be related to that particular application. However, in the event that the mobile computing device 102 receives and installs the application (e.g., via the application binary file 324), features related to the application may now be highly relevant when monitoring for non-benign (e.g. malicious or performance-degrading) activity on the mobile computing device 102 related to the application. Thus, by modifying the lean classifier to include application-specific features, the mobile computing device 102 may benefit from increased vigilance of behaviors related to the application occurring on the mobile computing device 102.

Figure 4:
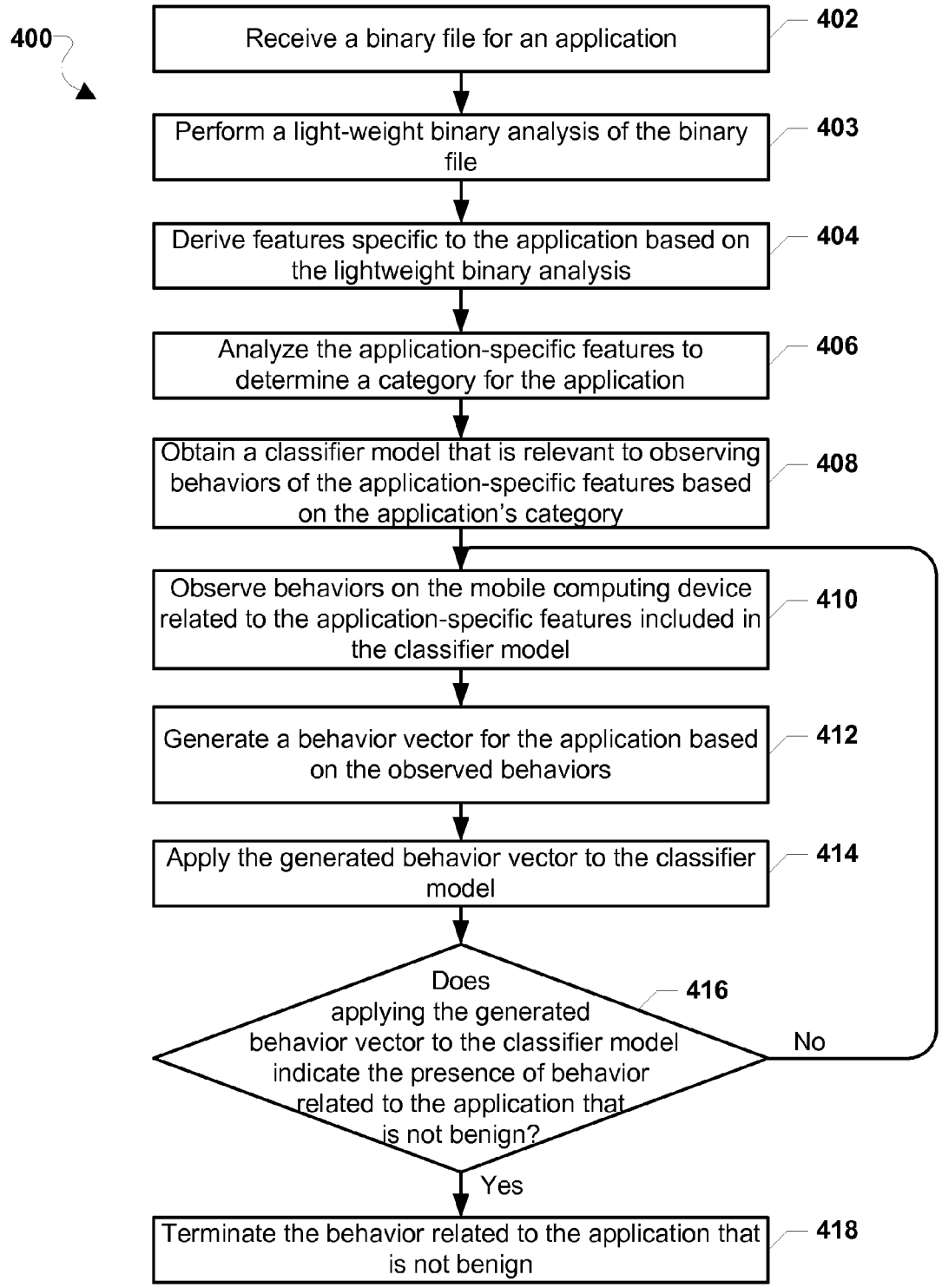
FIG. 4 is a process flow diagram illustrating an aspect method of obtaining classifier models on a mobile computing device that include features specific to an application operating on the mobile computing device.

FIG. 4 illustrates an aspect method 400 that may be implemented by one or more processors on a mobile computing device for obtaining a classifier model that takes into account specific features related to an application received and installed on the mobile computing device to ensure that the classifier model includes features that will enable the mobile computing device to detect non-benign behavior related to the application occurring on the mobile computing device. One or more processors on the mobile computing device may perform the following operations of the method 400 in response to the mobile computing device's receiving a binary file for an application in block 402, such as from an application store.

In block 403, the processor executing the lightweight binary analyzer may perform a lightweight binary analysis of the binary file. In some aspects, the lightweight binary analysis may include a static analysis of the binary file before the application is installed to identify various characteristics of the binary file, including the APIs, methods, function calls, etc. utilized in the binary file, as well as the hardware and/or other components of the mobile computing device likely to interact with the application during runtime. In essence, by performing the lightweight binary analysis, the processor executing the lightweight binary analyzer may identify the capabilities of the application or other information that may indicate the expected behavior of the application.

In some aspects, the light-weight binary analyzer unit may perform a light-weight binary analysis of the application's binary file in block 403 in response to a determination that a generic classifier model used on the mobile computing device to classify the application's behavior is not suitable for making such determinations/classifications. Specifically, in such aspects (see FIG. 11), the at least one device processor on the mobile computing device may initially attempt to utilize a generic classifier model that includes generic/non-specific features to classify the application's behaviors. In response to determining that there is a consistent history of behavior classification determinations with low confidence values associated with the generic classifier model (i.e., that the generic classifier is not suited to classifying the application's behaviors), the one or more device processors may perform the light-weight binary analysis of the binary file in block 403 and obtain/generate and utilize a classifier model that includes application-specific features based on that light-weight binary analysis by performing the operations of the method 400 as further described herein.

In block 404, the processor executing the application-specific feature generator may derive features specific to the application based on the lightweight binary analysis of the binary file, such as by determining or approximating features that are related to the capabilities, characteristics, abilities, etc. specific to the application as determined as a result of the lightweight analysis performed in block 403. For example, the processor executing the lightweight binary analyzer may identify that, based on the APIs and call flows of the application identified during the lightweight binary analysis, the application may be associated with features that include sending various types of messages to contacts in the user's address book.

In some aspects (e.g., as described with reference to FIG. 5), the device processor executing the application-specific feature generator may identify features that are specific and/or relatively unique to the application by filtering out features that may be generally associated with other applications, such as features related to standard input/output protocols, etc. In such aspects, by separating out only those features that are especially relevant/specific to the application, the device processor(s) executing the behavior analyzer unit and/or the behavior observer unit may ensure that these highly relevant, application-specific features represented in a classifier model used to monitor the application's behavior, thereby increasing the likelihood of identifying and classifying non-benign behavior related to the application.

In some aspects, the processor executing the light-weight binary analyzer unit may perform a partial light-weight binary analysis of the application's binary file in block 403. In such aspects, the processor executing the light-weight binary analyzer unit may perform the light-weight binary analysis on a portion of the application's binary file that may not be adequately represented in generic classifier models to ensure that highly relevant features are identified and derived as a result of performing the operations in block 404.

In block 406, the processor executing the application-specific feature generator may analyze the application-specific features derived in block 404 in order to determine a category for the application. As described, the application's category may describe the expected use, function, performance, and/or behavior of the application on the mobile computing device, and may be such categories as "games," "news," "messaging," etc. In some aspects, the processor executing the application-specific feature generator may associate the application with more than one category (e.g., a "mixed" category, such as "games & messaging" category) or with a related group/family of categories. For example, the processor executing the application-specific feature generator may determine that the application's specific features belong to a general "entertainment" category, a narrower "games" category, and an even narrower "match-three game" category.

In block 408, the processor executing the behavior analyzer unit may obtain a classifier model that is relevant to observing behaviors of the application-specific features derived in block 404 based on the application's category determined in block 406. In some aspects, the classifier model may be used to test, evaluate, and/or classify behaviors related to features specific to the application in order to detect and halt non-benign behavior on the mobile computing device.

In some aspects (e.g., as described with reference to FIG. 6), the device processor executing the behavior analyzer unit may compare the application's category with a list of application categories associated with a previously generated classifier model, and in response to determining that the application's category matches a category in the list, the processor may retrieve the previously generated classifier model associated with the matching category for use in monitoring for non-benign behavior. In the event there is no matching category, for example, because the application is new or does not have an easily definable type, the device processor executing the behavior analyzer unit may generate a classifier model that includes the application-specific features determined in block 404.

In some aspects, the processor executing the behavior analyzer unit may also obtain a classifier model by requesting classifier information for features and/or a category related to the application from a server (e.g., as described with reference to FIGS. 7A-7B).

In some aspects, the processor executing the behavior analyzer unit may obtain a classifier model that tests the behavior of features related to the application by modifying a lean classifier model generated from a full classifier received from a server to include such application-specific features (e.g., as described with reference to FIG. 8).

In block 410, the processor executing the behavior observer unit may observe behaviors on the mobile computing device related to the application-specific features included/described in the classifier model obtained in block 408. As described (e.g., with reference to FIG. 2), the processor executing the behavior observer unit may receive observations, data, signals, measurements, readings, and/or various other types of information regarding features related to the application. In some aspects, the processor executing the behavior observer unit may observe the behaviors related to the application by collecting information directly from the application (e.g., via standard input/out, the application's APIs, etc.). In some aspects, the processor executing the behavior observer unit may observe behaviors on the mobile computing device related to the application by gathering information indirectly based on application's activities and interactions with various components on the mobile computing device.

In some aspects of the operations performed in block 410 (e.g., as described with reference to FIG. 9), one or more processors on the mobile computing device may compare the application-specific features identified via the lightweight binary analysis performed in block 404 with features related to the application that are actually occurring on the mobile device. In response to determining a non-trivial difference between the application-specific features included in the classifier model and the features actually observed to occur on the mobile computing device, one or more processors on the device may obtain another classifier that accounts for the actual features related to the application.

In block 412, the processor executing the behavior analyzer unit may generate a behavior vector for the mobile computing device's current configuration based on the behaviors observed in block 410 as described above (e.g., with reference to FIG. 2).

In block 414, the processor executing the classifier unit and/or the processor executing the behavior analyzer unit may apply the generated behavior vector to the classifier model, such as by applying the generated behavior vectors to boosted decision stumps describing the features related to the application. In some aspects, the processor(s) executing the classifier unit and/or the behavior analyzer unit may apply values in the behavior vector representing a particular application-specific feature to one or more boosted decision stumps that test that particular feature. The results of applying the behavior vector values to an boosted decision stump (sometime referred to herein as "behavior classification determinations") is a binary outcome, such as "yes" or "no," with each outcome assigned a weighted probability indicating a confidence factor that the behavior of the application-specific feature is benign or not benign (e.g., malicious or performance degrading).

For example, the processor executing the behavior classifier unit may test a feature of the application related to placing online orders through a secure web portal. The processor executing the behavior classifier unit may apply a behavior vector value for the online-ordering feature to resolve boosted decision stumps related to that feature. The boosted decision stumps associated with the online-ordering feature may include the tests of whether "the application is storing the user's credit card information," "the application is sending the user's credit card information to an unsecured website," etc. Each resolution for a boosted decision stump test may produce a certain weighted probability that the behavior of the remote-parking feature of the mobile computing device is not benign (or is benign), and the processor(s) executing the behavior classifier and/or the behavior analyzer unit may combine the weighted probabilities to determine whether behaviors related to the application are not benign with a certain confidence of that conclusion.

In some aspects (e.g., as described with reference to FIG. 10), one or more of the processors on the mobile computing device may keep track of the confidence values of behavior classification determinations (i.e., benign or not benign) to determine whether those determinations indicate that the classifier model currently used to monitor/detect non-benign behaviors related to the application is inadequate. In response to determining that the current classifier model is consistently yielding behavior classification determinations with low confidence values, the one or more processors may perform another lightweight binary analysis of the application to identify a more suitable category for the application and to obtain a classifier model that includes features related to that new category, thereby increasingly the likelihood that future behavior classification determinations will have higher confidence values.

In determination block 416, the processor(s) executing the behavior analyzer unit and/or the classifier unit may determine whether applying the behavior vector generated in block 414 to the classifier model indicates the presence of non-benign behavior related to the application. For instance, in the above example in which the classifier model is used to monitor an online-ordering feature, the processor(s) executing the behavior analyzer unit and/or the classifier unit may determine with a particular certainty (i.e., confidence value) that behaviors related to the application are very likely to be non-benign (e.g., malicious, performance degrading, etc.) when the application is storing the user's credit card information and/or is sending the credit card information to an unsecured or unknown website.

In response to the processor(s) executing the behavior analyzer unit and/or the classifier unit determining that applying the generated behavior vector to the classifier model indicates the presence of non-benign behavior related to the application (i.e., determination block 416="Yes"), the processor executing the actuator may terminate the non-benign behaviors related to the application (or the application itself) in block 418. To terminate the non-benign behavior, the processor executing the actuator may restrict access to the feature(s) related to the offending behavior, or identify the element responsible for the non-benign behavior and quarantine, delete, or cure that element. Thus, in the above example, the processor executing the actuator unit may terminate an application sending credit card information to an unsecure website.

In response to the processor(s) executing the behavior analyzer unit and/or the classifier unit determining that applying the generated behavior vector to the classifier model does not indicate the presence of non-benign behavior related to the application (i.e. determination block 416="No"), one or more processors on the mobile computing device may repeat the above operations in block 410 of the method 400 in a loop by observing behaviors on the mobile computing device related to the application device.

Figure 5:
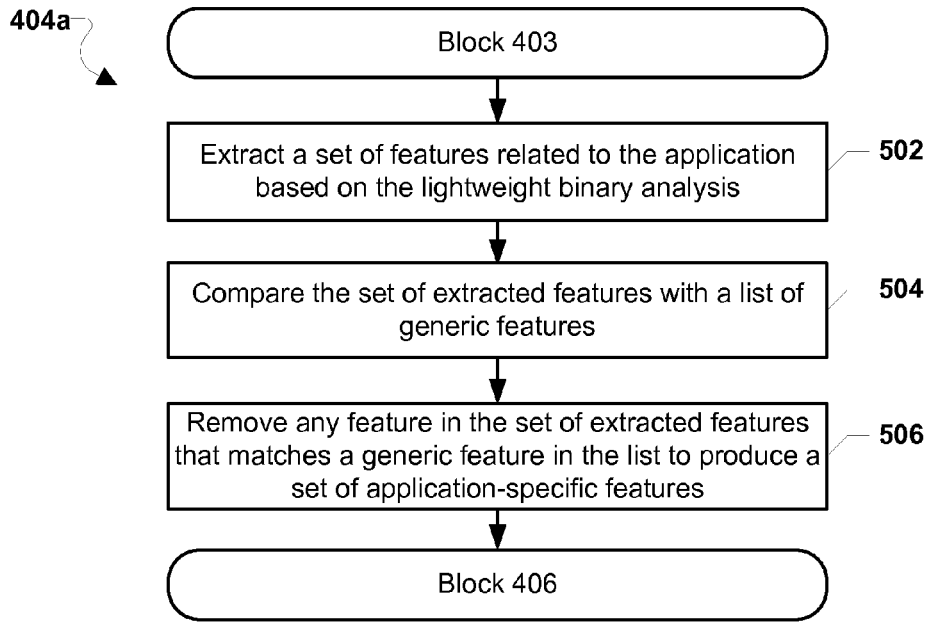
FIG. 5 is a process flow diagram illustrating an aspect method of generating a set of application-specific features for an application.

FIG. 5 illustrates an aspect method 404a that may be implemented by one or more processors on a mobile computing device for identifying a set of features specific to an application. The operations of the method 404a implement some aspects of the operations performed in block 404 of the method 400. Thus, the processor may begin performing the operations of the method 404a in response to the processor executing the lightweight binary analyzer unit's performing a lightweight binary analysis of the binary file in block 403 of the method 400.

In some aspects, the processor on the mobile computing device may attempt to obtain a classifier model that is highly suited for monitoring for/detecting non-benign behaviors associated with a particular application. In such aspects, the processor may attempt to determine the features that are most relevant to monitoring the application's behavior, and in many cases, these highly relevant features may be specifically tailored to the operations and characteristics of the application, rather than generic to various types of applications. In other words, features standard to numerous applications (e.g., standard input/output schemes, standard communication protocol procedures, etc.) may reveal very little about whether an application's behavior is not-benign, whereas features relatively unique to the application may clearly indicate whether the application's behavior is not-benign with a high confidence.

In block 502, the device processor executing the application-specific feature generator may extract a set of features related to the application based on the lightweight binary analysis. In some aspects, the device processor executing the application-specific feature generator may analyze the characteristics, capabilities, and/or functions of the application as revealed by the lightweight binary analysis in order to determine or approximate the features (e.g., behaviors of interest, such as a frequency of sending SMS messages) related to the application, which may include features generic to many applications (e.g., standard communication protocols) and features that are primarily (or solely) associated with the application.

Thus, in block 504, the device processor executing the application-specific feature generator may compare the set of extracted features with a list of generic features. As described, these generic features may be common to many different types of applications and may not be very useful when monitoring for non-benign behaviors related to the application. This list of generic features may be preloaded on the mobile computing device, gathered over time on the device, etc.

In block 506, the device processor executing the application-specific feature generator may remove any feature in the set of extracted features that matches a generic feature in the list in order to produce a set of features that is specifically related to the application (i.e., a set of application-specific features). Thus, in some aspects, the set of application-specific features used to determine a category of the application and/or to obtain a classifier model suitable for monitoring the application's behaviors may include features that are not generic to many different application, and instead, may be primarily (or exclusively) related and highly relevant to the application.

The device processor executing the behavior analyzer unit may continue performing the operations of block 406 of the method 400 by analyzing the set of application-specific features produced in block 506 in order to determine a category for the application.

Figure 6:
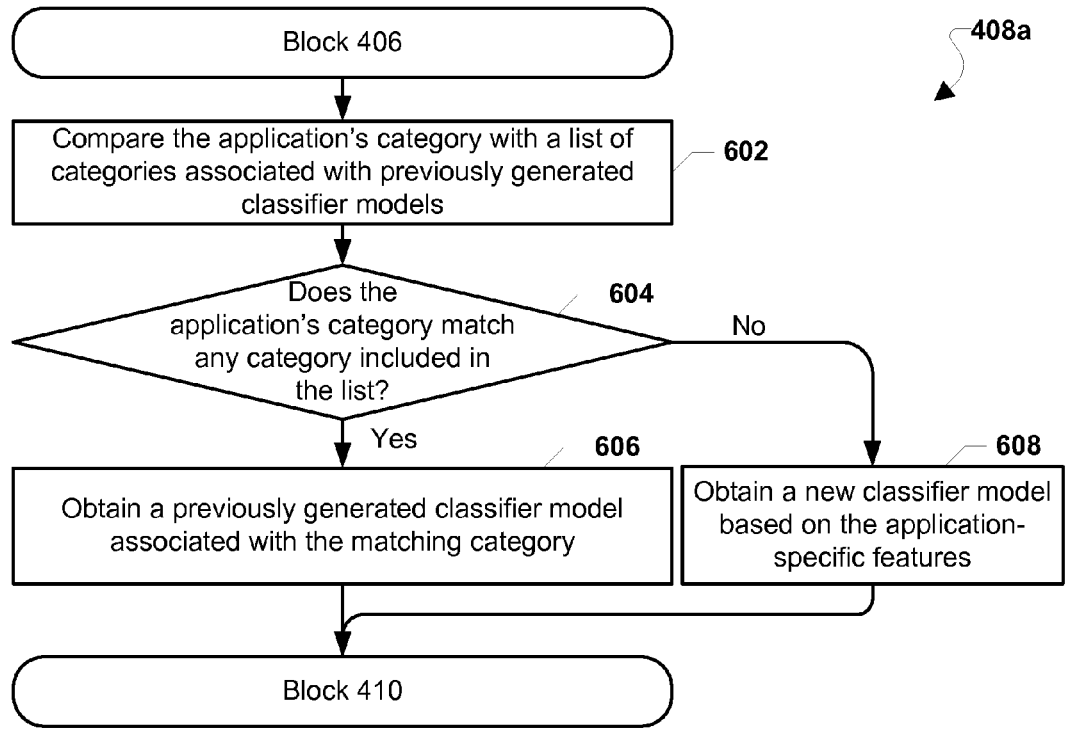
FIG. 6 is a process flow diagram illustrating an aspect method of obtaining a classifier model that includes one or more features specifically related to a an application operating on a mobile computing device based on a category of applications to which the application belongs.

FIG. 6 illustrates an aspect method 408a that may be implemented by one or more processors on a mobile computing device for obtaining a classifier model suitable for monitoring an application based on the application's category. The operations of the method 408a implement some aspects of the operations performed in block 408 of the method 400. Thus, the processor may begin performing the operations of the method 408a in response to the processor executing the behavior analyzer unit's determining a category for the application in block 406 of the method 400.

In block 602, the device processor executing the behavior analyzer unit may compare the category of the application determine in block 406 with a list of categories associated with previously generated classifier models. In some aspects, the mobile computing device may have access to one or more previously generated classifier models that may be stored locally on the mobile computing device and/or received from another mobile or from a server (e.g., the server 116). In such aspects, the previously generated classifier models may include/test particular features related to a particular category of application. For example, a "games" application category may be associated with a classifier model that tests features related to graphical displays, specialized user inputs, posting scores to an online leader board, and various other features typically associated with game applications.

In determination block 604, the device processor executing the behavior analyzer unit may determine whether the application's category matches any category included in the list. As described (e.g., with reference to FIG. 4), the application may fit one or more categories, and the device processor executing the behavior analyzer unit may determine whether the application matches at least one category. For example, the device processor executing the behavior analyzer unit may determine that the application's "music player" category matches a "music player" category, a broader "music" category, and a generic "entertainment" category. Further, in response to identifying multiple matching categories, the device processor executing the behavior analyzer unit may identify the category that best describes/fits the application, such as the "Music Player" category in the above example as that category is the most specific matching category and thus most likely to be useful/relevant in monitoring the application for non-benign behavior.

In some aspects of the operations performed in determination block 604, when there is no clear category that matches the application's category, the device processor executing the behavior analyzer unit may attempt to identify a matching category based on a comparison of the application's specific features and features tested by or associated with a previously generated models associated with each respective category in the list. In other words, the device processor executing the behavior analyzer unit and/or the processor executing the application-specific generator may attempt to find a category associated with a previously generated classifier model that tests features that are sufficiently similar to the application's specific features such that that classifier model may be useful in monitoring the application for non-benign behavior.

In response to determining that the application's category matches a category included in the list (i.e., determination block 604="Yes"), the device processor executing the behavior analyzer unit may obtain a previously generated classifier model associated with the matching category, in block 606, such as by retrieving the classifier model from local memory on the mobile computing device and/or from another device through a network connection (e.g., the server 116 or another mobile computing device). By identifying and obtaining a previously generated classifier model associated with a category that matches and/or is relevant to the application, the device processor executing the behavior analyzer unit may avoid the costs of generating a new classifier model for the application from scratch, saving considerable time, power, and processing resources.

In response to determining that the application's category does not match any category included in the list (i.e., determination block 604="No"), the device processor executing the behavior analyzer unit may obtain a new classifier model based on the application's specific features, in block 608, because there is not a previously generated classifier model suitable for monitoring and classifying the application's behaviors. In some aspects, the device processor executing the behavior analyzer unit may generate the new classifier model from scratch by training a corpus of data with the application's specific features to develop a classifier model that tests, evaluates, and/or classifies behaviors related to those application-specific features. In particular aspects (e.g., as described with reference to FIG. 8), the processor executing the behavior analyzer unit may obtain the new classifier model by pruning a full classifier received from a server to produce a "lean" classifier that includes the application-specific features.

Regardless of whether the processor executing the behavior analyzer unit obtains a previously generated classifier model in block 606 or obtains a new classifier model in block 608, the processor executing the behavior observer unit may perform the operations in block 410 of the method 400 by observing behaviors on the mobile computing device related to the application-specific features included in the obtained classifier model.

Figure 7A:
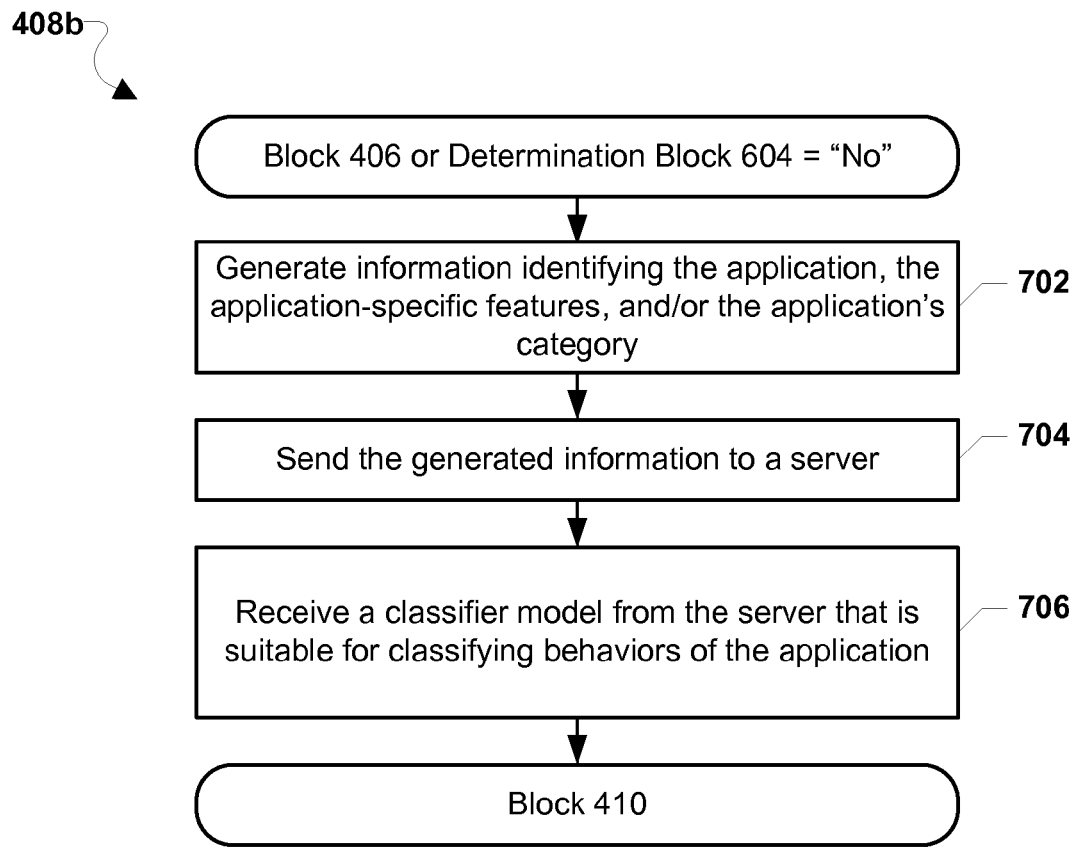
FIG. 7A is a process flow diagram illustrating an aspect method of receiving a classifier model that includes one or more features related to an application operating on a mobile computing device from a server by sending the server information related to the application.

FIG. 7A illustrates an aspect method 408b that may be implemented by one or more processors on a mobile computing device for obtaining a classifier model from a server that includes features specific to an application operating on the mobile computing device. The operations of the method 408b may implement some aspects of the operations of block 408 of the method 400. Thus, in some aspects, the device processor may begin performing the operations of the method 408b in response to the processor executing the behavior analyzer unit determining a category for the application in block 406 of the method 400.

Alternatively, the operations of the method 408b may implement some aspects of the operations of block 608 of the method 408a. In such aspects, the one or more processors may begin performing the operations of the method 408b in response to the processor executing the behavior analyzer unit determining that the application's category does not match any category included in a list of categories associated with previously generated classifier models (i.e., determination block 604="No").

In some aspects, one or more processors operating on the mobile computing device may be in communication with a network server (e.g., the server 116), and the one or more processors may leverage the server's superior computing power and access to a large corpus of information to obtain a classifier model that includes features specific to the application and especially useful in detecting non-benign (e.g., malicious or performance-degrading) behavior on the mobile computing device related to the application.

In block 702, the processor executing the behavior analyzer unit may generate information identifying the application, the application's specific features, and/or the application's category as determined in block 406. In some aspects of the operations performed in block 702, the processor executing the behavior analyzer unit may also include additional information (e.g., developer name, version number, application title, etc.) in the information sent to the server to enable the server to identify specific features related to the application, such as by enabling the server to perform a database look-up operation using the identifying information. The processor executing the behavior analyzer unit may send the information generated in block 702 to the server in block 704, such as by utilizing or extending an API used to communicate with the server.

In block 706, the processor executing the behavior analyzer unit may receive a classifier model from the server that is suitable for classifying behaviors of the application based on the generated information sent to the server in block 704. As such, the received classifier model may include features specific to the application in the form of boosted decision stumps, test conditions, etc., and the processor executing the behavior analyzer unit may use the boosted decision stumps to classify a behavior related to the application as not benign (e.g., malicious and/or performance-degrading).

The processor executing the behavior observer unit may perform the operations in block 410 of the method 400 by observing behaviors on the mobile computing device related to the application-specific features included in the classifier model received in block 706.

Figure 7B:
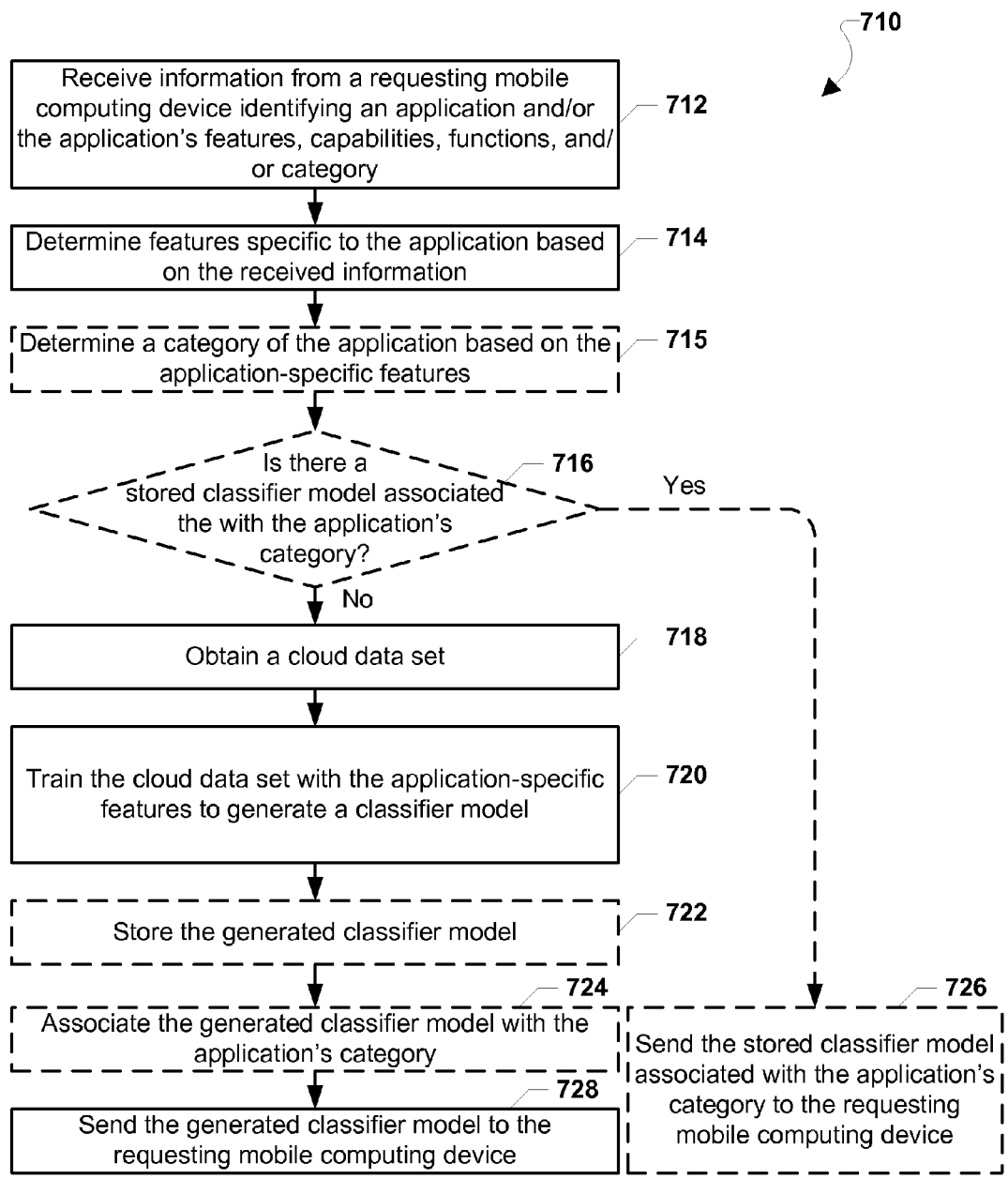
FIG. 7B is a process flow diagram illustrating an aspect method of generating on a server a classifier model that includes features specifically related to an application operating on a mobile computing device in response to receiving information identifying the application from the mobile computing device.

FIG. 7B illustrates an aspect method 710 that may be implemented by a server processor executing a model generator unit for sending a classifier model that includes features specific to an application operating on a mobile computing device in response to receiving information from the device identifying the application and/or one or more of the application's capabilities, functionality, states, features, and category.

The server processor executing the model generator unit may have access to a vast amount of crowd-sourced information (i.e., a cloud data set) that the server processor may use to create behavior classifier models. Given its access to such a large data set of behavioral information, the server processor executing the model generator unit may be particularly suited for generating classifier models that are specifically tailored for observing and classifying behaviors associated with a particular application. Thus, in some aspects, the model generator unit may provide highly effective and specialized classifier models to a mobile computing device that include features specific to an application that is operating or that will operate on the mobile computing device.

In block 712, the server processor executing the model generator unit may receive information from a requesting mobile computing device identifying an application and/or the application's capabilities, functions, features, and/or category. In some aspects, the information received from the mobile computing device may also include information identifying the mobile computing device and or the device's capabilities (e.g., model numbers, serial numbers, software versions, functions, etc.) that the server processor executing the model generator unit may use to determine the capabilities/functionalities of the application and/or the mobile computing device on which the application is executing.

In block 714, the model generator unit may determine features specific to the application based on the information received in block 712. In some aspects, the model generator unit may access a classifier database and may retrieve features associated with the information received from the mobile computing device. For example, the model generator unit may perform a lookup of the features associated with a particular application title included in the received identifying information.

In some aspects of the operations performed in block 714, the server processor executing the model generator unit may determine features specific to the application solely based on the information received from the mobile computing device in the event that the received information already includes a set of application-specific features for the application.

In optional block 715, the server processor executing the model generator unit may determine a category of the application based on the application-specific features, such as by performing operations similar to the operations described in block 406 of the method 400. For example, the server processor executing the model generator unit may compare the application-specific features determined in block 714 with features associated with one or more different application categories—such as a "games" category or a "scheduling" category—to identify a category that is most related to the application-specific features.

In optional determination block 716, the server processor executing the model generator unit may determine whether there is a stored classifier model associated with the application's category as determined in optional block 715. In some optional aspects, the server processor executing the model generator unit may have previously stored classifier models associated with various application categories, and the server processor may attempt to recall a previously generated classifier model that includes the application's specific features instead of regenerating another classifier model based on the same features, thereby saving time and processing resources. Thus, in response to receiving from numerous mobile computing devices requests for classifier models for monitoring and classifying behavior of the same application, the server processor executing the model generator unit may send a previously generated model that includes the features related to the application to those mobile computing devices instead of generating a model from scratch for each of those mobile computing devices.

In response to determining that there is a stored classifier model that associated with the application's category determined in optional block 715 (i.e., optional determination block 716="Yes"), the server processor executing the model generator unit may send the stored classifier model associated with the application's category to the requesting mobile computing device in optional block 726. Upon receiving the stored device-specific lean classifier model, the requesting mobile computing device may begin using the model to monitor and classifying the application's behavior (e.g., as described with reference to FIGS. 4 and 7A).

In response to determining that there is no stored classifier model associated with the application's category determined in optional block 715 (i.e., optional determination block 716="No"), the server processor executing the model generator unit may obtain a cloud data set in block 718 that includes features associated with various different types of applications. In some aspects, in performing the above operations in block 718, the model generator unit may retrieve the cloud data set from a cloud unit (e.g., the cloud unit 302 described with reference to FIG. 3).

In block 720, the server processor executing the model generator unit may also train the obtained cloud data set with the application-specific features identified in block 714 to generate a classifier model. In other words, the server processor executing the model generator unit may process the cloud data set or a full classifier model developed from the cloud data set to filter out classifiers related to features that are irrelevant to the application in order to generate a classifier model that may enable the requesting mobile computing device to efficiently and effectively monitor and classify behaviors related to the application that are non-benign (e.g., malicious and/or performance-degrading). For example, the server processor executing the model generator unit may run a full machine-learning training algorithm using the application-specific features identified in block 714 (and/or the category determined in optional block 715) to choose the classifier model that best represents the capabilities, functionality, and/or characteristics of the application. In some aspects, the model generator unit may generate one or more sets of boosted decision stumps corresponding to each feature related to the application.

In optional block 722, the server processor executing the model generator unit may store the classifier model generated in block 720, for example, by storing it in a classifier database (not shown). In optional block 724, the server processor executing the model generator unit may also associate the classifier model generated in block 720 with the application's category identified in optional block 715. In some aspects, the server processor executing the model generator unit may manage the list of stored classifier models, thereby enabling the server processor to perform database lookup operations in the future to obtain stored classifier models for applications associated with the same category.

In block 728, the server processor executing the model generator unit may send to the requesting mobile computing device the classifier model generated in block 720, and the requesting mobile computing device may begin using the received classifier model to monitor and classify the behaviors of the application (e.g., as described above with reference to FIGS. 4 and 7A).

Figure 8:
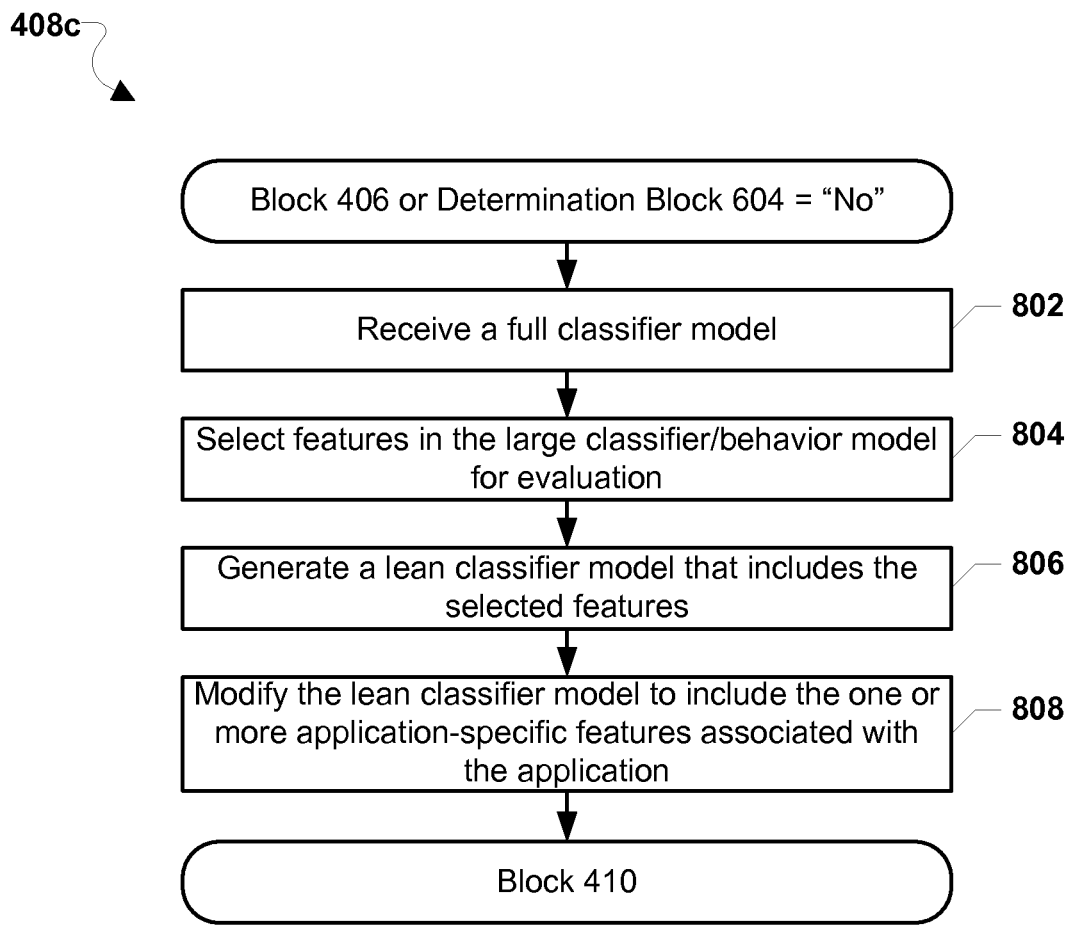
FIG. 8 is a process flow diagram illustrating an aspect method of generating a classifier model that includes one or more features specifically related to an application operating on a mobile computing device by modifying a lean classifier model generated on the mobile computing device.

FIG. 8 illustrates an aspect method 408c that may be implemented by one or more processors operating on a mobile computing device for modifying a lean classifier model to include features specific to an application received on the mobile computing device. The operations of the method 408c implement some aspects of the operations of block 408 of the method 400, and in some aspects, the one or more processors may begin performing the operations of the method 408c in response to the processor executing the behavior analyzer unit determining a category for the application in block 406 of the method 400.

In alternative aspects, the operations of the method 408c may implement some aspects of the operations of block 608 of the method 408a. In such aspects, the one or more processors may begin performing the operations of the method 408c in response to the processor executing the behavior analyzer unit determining that the application's category does not match any category included in a list of categories associated with previously generated classifier models (i.e., determination block 604="No").

In block 802, a processor on the mobile computing device may receive a full classifier model that includes or identifies a large number of features and/or a plurality of test conditions associated with the features. In some aspects, the full classifier model may include a plurality of boosted decision trees or stumps that are suitable for use by the mobile computing device in classifying a behavior as not-benign (e.g., malicious or performance degrading), such as by applying behavior vector values as inputs to the boosted decision stumps/trees to test conditions relating to a feature of the mobile computing device.

Applying behavior vector values to a large number of stumps/trees to test multiple features in large classifier model may be taxing on the mobile computing device. For example, these operations may occupy the processor and memory functions to the detriment of the performance of other processes of the mobile computing device. These operations may also deplete the battery power of the mobile computing device. To help reduce these diminishing affects on the mobile computing device's performance, the mobile computing device may implement a joint feature selection and pruning algorithm to generate a lean classifier model from the large classifier model (e.g., as described above with reference to FIG. 3).

In block 804, the processor executing the behavior analyzer unit may select features in the full classifier model to monitor and to evaluate in order to classify related mobile computing device behaviors. Various criteria may be used to select the features and boosted decision stumps from the full classifier model. For example, a rule of the joint feature selection and pruning algorithm may specify selecting features considered vital to the proper operation of the mobile computing device, like processor, memory, and communication features. The rule may also specify a first number of features (e.g. the first 50, 100, 200, 1,000, etc.) that may be appropriate when the full classifier model is ordered in a manner from most to least vital or common mobile computing device features.

In block 806, the behavior analyzer unit operating in the processing core may generate the lean classifier model from the features selected in block 804 to test the behavior of at least one feature of the mobile computing device. In some aspects, the behavior analyzer unit may scan through the list of boosted decision stumps included in the large classifier unit and incorporate into the lean classifier model every boosted decision stump that tests or is answered by at least one of the selected features. Thus, the lean classifier model may include both the selected features and the boosted decision stumps associated with those selected features.

In block 808, the processor executing the behavior analyzer unit may modify the lean classifier model generated in block 806 to include the one or more features determined to be specific to the application (e.g., as described in block 404 of the method 400). In some aspects of the operations performed in block 806, the processor executing the behavior analyzer unit may modify the lean classifier model to include the application-specific features without needing to contact a server (e.g., the server 116), such as by incorporating the application-specific features into the lean classifier generated in block 806, thereby ensuring that the modified lean classifier model may be useful in monitoring for and classifying behaviors related to the application.

The device processor executing the behavior observer unit may perform the operations in block 410 of the method 400 by observing behaviors on the mobile computing device related to the application-specific features included in the classifier model modified in block 808.

Figure 9:
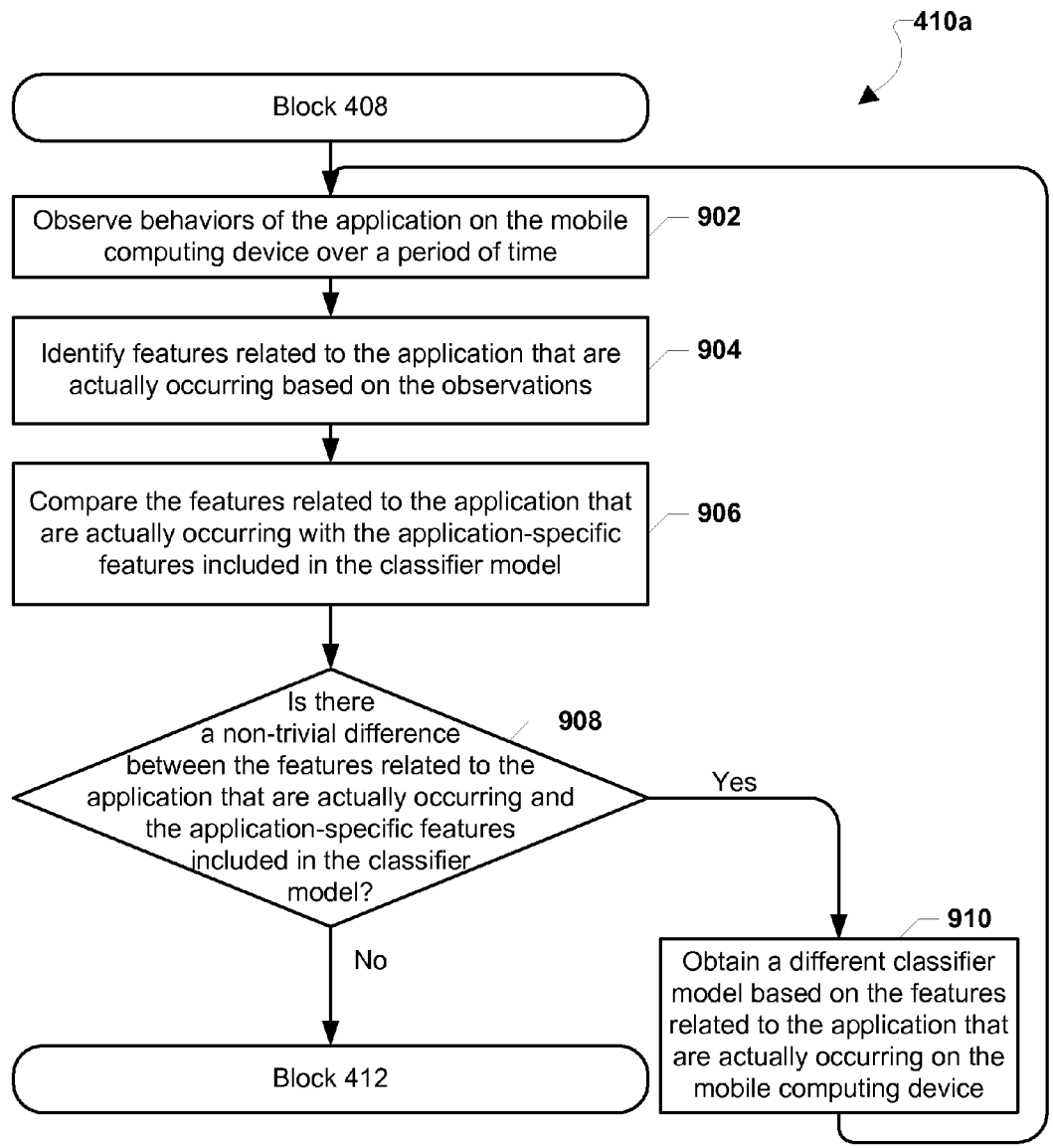
FIG. 9 is a process flow diagram illustrating an aspect method of obtaining a new classifier model for an application operating on a mobile computing device in response to determining that there is a non-trivial difference between features related to the application that are actually occurring and the application-specific features included in the current classifier model.

FIG. 9 illustrates an aspect method 410a that may be implemented by at least one processor on a mobile computing device for obtaining a different classifier model for monitoring and classifying behaviors of an application operating on the mobile computing device in response to determining that the application-specific features derived from a lightweight binary analysis of the application differ from features related to the application that are actually observed on the device. The operations of the method 410a implement some aspects of the operations performed in block 410 of the method 400. Thus, the at least one processor may begin performing the operations of the method 410a in response to the device processor executing the behavior analyzer unit's obtaining a classifier model relevant to observing behaviors of the application's specific features in block 408 of the method 400.

In some aspects, the application-specific features associated with an application and derived from a lightweight binary analysis of the application may not accurately reflect the application's capabilities, functionality, and/or features during runtime because the binary analysis is a static and potentially limited assessment of the application's features. Because the application's actual behaviors during runtime may differ to varying degrees from the behaviors that are expected to occur based on the lightweight binary analysis, the classifier model obtained to monitor and classify the application's actual behaviors may be ineffective in some cases in which there is a non-trivial difference between the features included in the classifier model and the application's features that are actually observed during runtime. The classifier model obtained based on a binary analysis of the application may also be ineffective in other situations in which the application's binary file is designed in such a way that the application's actual features are obscured, either purposefully or through poor design. To ensure that the classifier model used to monitor and classify the application's behavior is suitable, one or more processors on the mobile computing device may perform the following operations.

In block 902, the device processor executing the behavior observer unit may observe behaviors of the application on the mobile computing device over a period of time. For example, the device processor executing the behavior observer unit may observe the application's actual APIs implementations, resource requests, communications with other components of the mobile computing device, data accesses, etc.

Based on the observations made in block 902, the device processor executing the behavior observer unit and/or the device processor executing the behavior analyzer unit may identify features related to the application that are actually occurring on the mobile computing device in block 904. For example, the device processor(s) may identify features based on the application's behavior relating to conducting online transactions (e.g., subscribing to pay-per-view content).

The device processor executing the behavior observer unit and/or the device processor executing the behavior analyzer unit may also compare the featured related to the application that are actually occurring on the mobile computing device with the application-specific features included in the classifier model currently used to monitor and classify the application's behaviors, in block 906. Based on this comparison, the device processor executing the behavior observer unit and/or the device processor executing the behavior analyzer unit may determine whether there is a non-trivial (i.e., substantial) difference between the features related to the application that are actually occurring on the mobile computing device and the application-specific features currently included in the classifier model, in determination block 908. In some aspects, there may be a substantial or non-trivial difference when one or more observed features are not included in the classifier model, and those observed features may be highly relevant to monitoring for non-benign behaviors related to the application. The operations of blocks 906 and 908 may be performed together in the same step.

In an example, observed features related to performing online transactions may not have been initially discovered as a result of the lightweight binary analysis performed on the application, and the device processor executing the behavior observer unit and/or the device processor executing the behavior analyzer unit may determine that there is a non-trivial difference when these online transaction features are highly important/relevant to monitoring and classifying the application's behaviors because the consequences to allowing non-benign behavior related to online transactions to occur may be severe.

In another example, the device processor executing the behavior observer unit and/or the device processor executing the behavior analyzer unit may instead determine that there not a substantial difference when discrepancies between the observed features related to the application and the application-specific features included in the classifier model are not important or not likely to be relevant in detecting non-benign behavior related to the application.

In some aspects, a similar determination may be made regarding application-specific features included in the classifier model that are not observed to actually occur on the mobile device. In such aspects, the device processor executing the behavior observer unit and/or the device processor executing the behavior analyzer unit may determine that there is a non-trivial difference when the current classifier model includes features that are not very relevant to the application's actual operations such that monitoring those features may not help in detecting non-benign behavior related to the application.

In response to determining that there is a non-trivial difference between the features related to the application that are actually occurring on the mobile computing device and the application-specific features included in the classifier model (i.e., determination block 908="Yes"), the device processor executing the behavior analyzer unit may obtain a different classifier model based on the features related to the application that are actually occurring on the mobile computing device, in block 910. In some aspects, the device processor executing the behavior analyzer unit may determine an updated category for the application that reflects the application's actual features and may obtain a new/different classifier based on that updated category (e.g., as described with reference to block 408 of the method 400 and/or the methods 408a-408c). The one or more processors may repeat the above operations of the method 410a with the new/different classifier obtained in block 910.

In response to determining that there is no difference or a trivial difference between the features related to the application that are actually occurring on the mobile computing device and the application-specific features included in the classifier model (i.e., determination block 908="No"), the device processor executing the behavior analyzer unit may continue performing the operations in block 412 of the method 400 by generating a behavior vector for the application based on the behaviors observed in block 902.

In some aspects of the operations performed in the method 410a, the one or more processors may engage in online learning over time, which may, for example, enable the one or more processors to become more efficient and accurate when identifying features related to an application that are actually occurring in block 904 and when determining whether those features are substantially different from the application-specific features included in the current classifier model in determination block 908.

Figure 10:
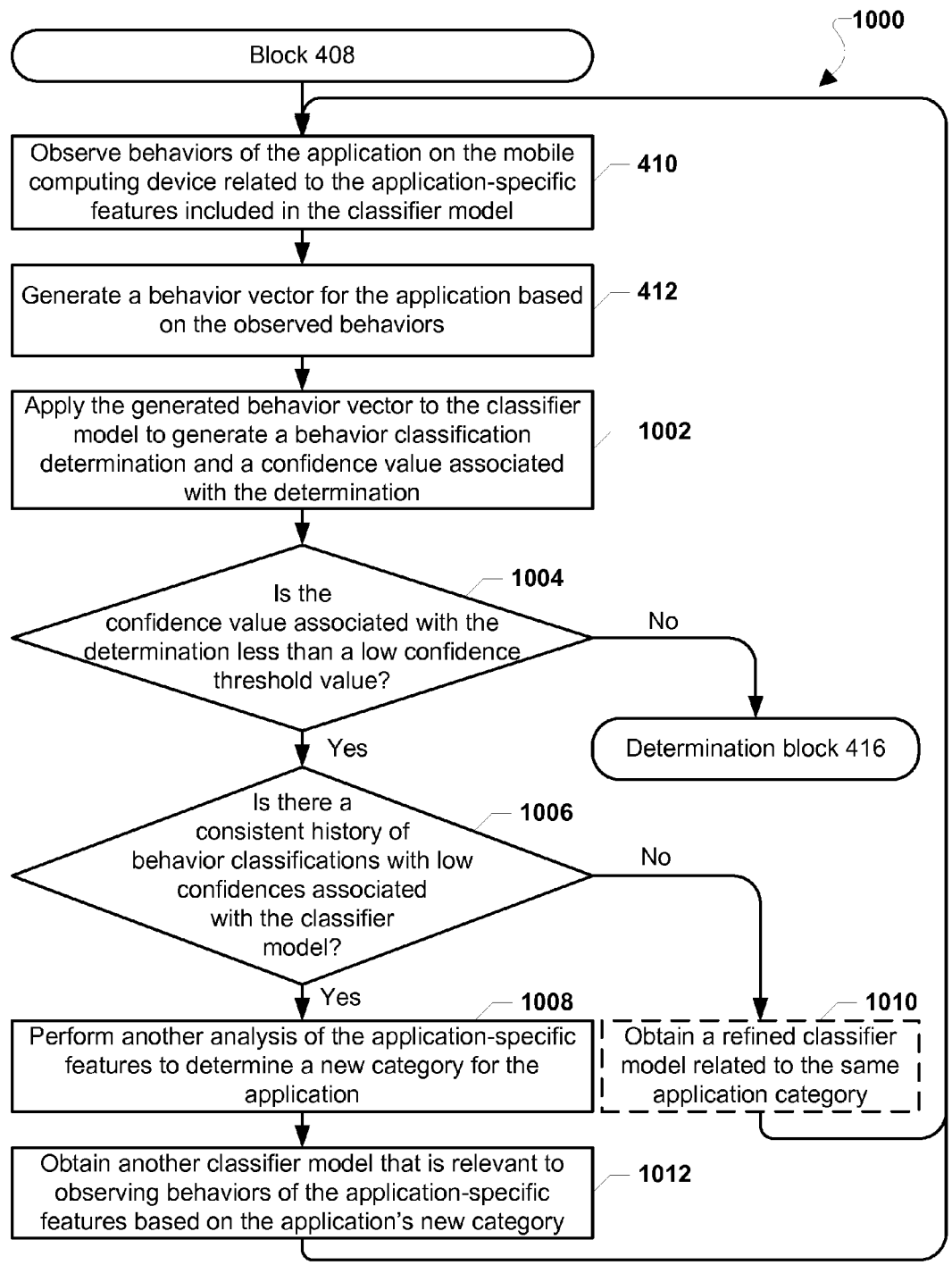
FIG. 10 is a process flow diagram illustrating an aspect method of obtaining a new classifier model associated with a different category of applications than a current classifier model in response to determining that there is a consistent history of behavior classification determinations with low confidences that are associated with the current classifier model.

FIG. 10 illustrates an aspect method 1000 that may be implemented by at least one processor on a mobile computing device for obtaining a different classifier model for monitoring and classifying behaviors of an application operating on the mobile computing device in response to determining that behavioral classification determinations using a current classifier model consistently return low-confidence values. The operations of the method 1000 implement some aspects of the operations performed in the method 400. Thus, the at least one processor may begin performing the operations of the method 1000 in response to the device processor executing the behavior analyzer unit's obtaining a classifier model relevant to observing behaviors of the application's specific features in block 408 of the method 400.

As described (e.g., with reference to FIG. 9), a lightweight binary analysis of an application may not always reveal all highly relevant features associated with that application. As a result, the device processor executing the behavior analyzer unit may determine that the application fits within a category (e.g., "games," "news," etc.) that is not suitable for monitoring the application for non-benign behaviors because behavior classification determinations (i.e., whether behavior is non-benign or benign) may be associated with low confidences. Thus, in order to increase the likelihood that any non-benign behaviors related to the application are detected are stopped/prevented, the at least one processor may perform the following operations of the method 1000 to resolve instances in which an application's category is initially misidentified and a classifier model obtained based on the misidentified category consistently returns low confidence values.

In performing the method 1000, one or more device processors may perform the operations in block 410-412 as described above with reference to the method 400. Thus, the device processor executing the behavior observer unit may observe behaviors of the application on the mobile computing device related to the application-specific features included in the classifier model in block 410, and the device processor executing the behavior analyzer unit may generate a behavior vector for the application based on the observed behaviors in block 412.

In block 1002, the device processor executing the behavior analyzer unit may apply the generated behavior vector to the classifier model in order to generate a behavior classification determination and a confidence value associated with the determination. In other words, the device processor executing the behavior analyzer unit may determine whether applying the behavior vector to the classifier model indicates the presence of non-benign (or benign) behaviors related to the application with a particular confidence value indicating the likelihood that the determination is accurate (e.g., a 90% confidence that a "non-benign" determination is accurate).

In determination block 1004, the device processor executing the behavior analyzer unit may determine whether the confidence value generated in block 1002 associated with the behavior classification determination is less than a low confidence threshold value. In some aspects, the low-confidence threshold may indicate the minimum confidence necessary for a behavior classification determination to have a reasonable or acceptable certainty of being accurate. In other words, the low-confidence threshold value may separate low-confidence determinations from high- or acceptable-confidence determinations. For example, confidence values less than a confidence value threshold of "80%" may be low-confidence values such that behavior classification determinations with low-confidence values may be of limited or no help in determining whether non-benign (or benign) behavior related to the application is actually occurring on the mobile computing device.

In response to determining that the confidence value associated with the behavior classification determination generated in block 1002 does not satisfy the threshold (e.g., is greater than or equal to the low confidence threshold value) (i.e., determination block 1004="No"), the device processor executing the behavior analyzer unit may continue performing the operations in determination block 416 of the method 400 by determining whether applying the generated behavior vector to the classifier model indicates the presence of behavior related to the application that is not benign. In other words, when the behavior classification determination's confidence value is sufficiently high, the device processor executing the behavior analyzer unit may determine whether non-benign behavior related to the application is occurring with a sufficient accuracy.

In response to determining that the confidence value associated with the behavior classification determination generated in block 1002 satisfies the threshold (e.g., is less than the low-confidence threshold value) (i.e., determination block 1004="Yes"), the device processor executing the behavior analyzer unit may determine whether there is a consistent history of behavior classification determinations with low-confidence values that are associated with the current classifier model in determination block 1006.

As described, an effect of utilizing a classifier model that is not suitable for monitoring the features of an application may be that classification determinations consistently have low-confidence values because the classifier model does not include features associated with the application that are highly relevant to analyzing the application's behavior. For example, based on the initial lightweight binary analysis of an application designed to enable users to take videos and share them with friends, the device processor executing the behavior analyzer unit may obtain a classifier model associated with a "Video Player" category, but in actuality, a classifier model associated with a "Social Media" category may be used more effectively to monitoring and classifying the application's behaviors. Thus, as a result of the using the classifier model associated with the "Video Player" application category, behavior classification determinations generated using that model may have low-confidence values because the features included in the classifier model may not reveal significant information about whether the application's behaviors are not benign.

In some aspects, the device processor executing the behavior analyzer unit may determine that there is a consistent history of low confidence values in response to determining that a certain number of determinations having low-confidence values have occurred within a certain time period. Specifically, the device processor executing the behavior analyzer unit may determine that there is a consistent history when it is clear that the classifier model used to make behavior classification determinations is fundamentally ineffective, as opposed to an otherwise effective classifier model that occasional produces determinations with spuriously low confidence values.

In response to determining that there is not a consistent history of behavior determination classifications with low-confidence values associated with the current classifier model (i.e., determination block 1006="No"), the device processor executing the behavior analyzer unit may optionally obtain a refined classifier model related to the same application category as the current classifier model in optional block 1010. In some aspects of the operations performed in optional block 1010, the device processor executing the behavior analyzer unit may obtain a different, "leaner" or refined classifier model within the same family as the current classifier model. For example, the current classifier model may be useful for classifying coarse behavior observations related to the application, and the device processor executing the behavior analyzer unit may obtain a similar classifier model useful for classifying finer behavior observations. By obtaining a refined classifier model related to the same application category as the current classifier model, the device processor executing the behavior analyzer unit may potentially increase the confidence values of future behavior classification determinations without needing to obtain a new classifier model from scratch to monitor and classify the application's behaviors.

The device processor executing the behavior analyzer unit may continue performing the operations of block 410 of the method 1000 by observing behaviors of the application on the mobile computing device related to the application-specific features included in the classifier model.

In some aspects of the operations performed in determination block 1006 in which the device processor executing the behavior analyzer unit has previously obtained a refined classifier model in optional block 1010, the processor may determine that there is a consistent history of low-confidence values in response to determining that utilizing a refined classifier model has caused confidence values to decrease. In such aspects, because refined classifier models typically yield higher confidence values, a drop in confidence values using a refined classifier model may indicate that the application category associated with the application may be misidentified and, as a result, any member of the group/family of classifier models associated with the misidentified category may be unsuitable for monitoring and classifying the application's behaviors.

Similarly, in particular aspects of the operations performed in determination block 1006, the device processor executing the behavior analyzer unit may determine that there is a consistent history of low-confidence values in response to determining that the classifier model with the finest scope in the group/family of classifiers related to the same application category also results in confidence values lower than the low-confidence threshold value. In other words, the device processor executing the behavior analyzer unit may determine that the application's category was misidentified because no classifier model associated with that category is capable of producing behavior classification determinations with a sufficiently high confidence values.

In response to determining that there is a consistent history of behavior classification determinations with low-confidence values associated with the classifier model (i.e., determination block 1006="Yes"), the device processor executing the behavior analyzer unit perform another analysis of the application-specific features related to the application in order to determine a new category for the application in block 1008. In some aspects, the device processor executing the behavior analyzer unit may analyze features that are actually occurring (e.g., as described with reference to FIG. 9) in addition to the application-specific features included in the current classifier model, and based on that analysis, the processor may identify a new application category for use with the application. For example, based on observations of observed features related to the application, the device processor executing the behavior analyzer unit may determine that the application may be more closely associated with a "Social Media" category than a "Video Player" category.

In block 1012, the device processor executing the behavior analyzer unit may obtain another classifier model that is more relevant to observing behaviors of the application-specific features based on the application's new category as determined in block 1008. In some aspects, the device processor executing the behavior analyzer unit may obtain the more-relevant classifier model by performing various methods, such as the methods 408a-408c described above.

The device processor executing the behavior analyzer unit may repeat the operations in block 410 of the method 1000 by observing behaviors of the application on the mobile computing device related to the application-specific features included in the classifier model obtained in block 1012.

Figure 11:
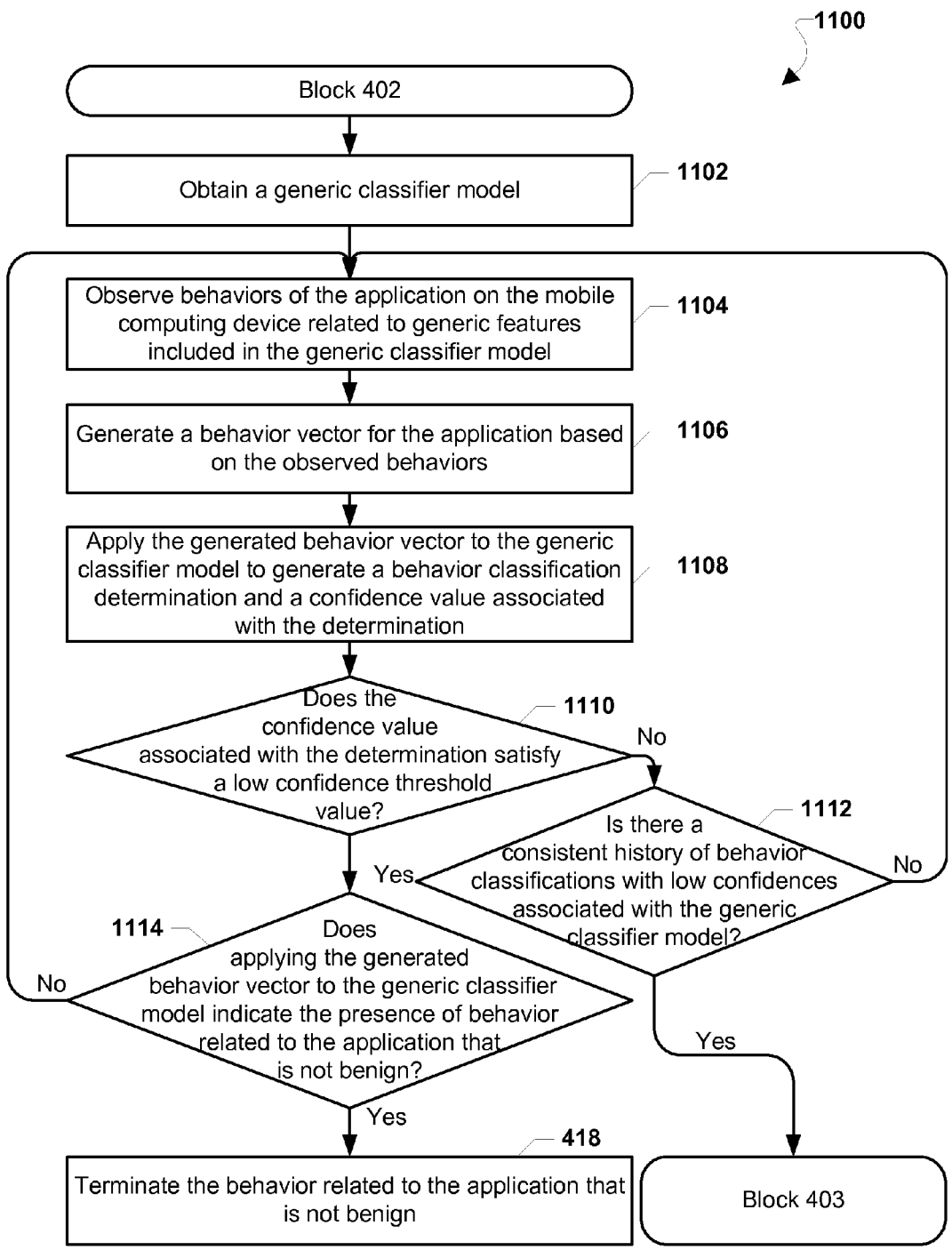
FIG. 11 is a process flow diagram illustrating an aspect method of obtaining an application-specific classifier model in response to determining that there is a consistent history of behavior classification determinations with low confidences that is associated with a generic classifier model.

FIG. 11 illustrates an aspect method 1100 that may be implemented by at least one processor on a mobile computing device for determining whether a generic classifier model is suitable for classifying behaviors of an application based on a history of confidence values associated with the generic classifier model. As described above (e.g., with reference to FIG. 4), obtaining an application-specific classifier model may require the device processor to perform a light-weight binary analysis of the application, derive application-specific features based on the lightweight binary analysis, and obtain/generate a classifier model that is relevant to observing those application-specific features. Performing one or all of these operations to obtain/generate the application-specific classifier model may require a non-trivial investment from the mobile computing device in terms of time, processing resources, and battery power.

In some aspects, before committing time and resources needed to obtain and implement an application-specific classifier model useful for observing features specific to the application, one or more device processors on the mobile computing device may initially utilize a generic classifier model that is easy or cost effective to obtain in an attempt to classify the behavior of the application. In other words, one or more device processors may obtain and utilize a classifier model that is relevant for classifying generic features that may not be specifically tailored to any one particular application. By initially attempting to classify the behavior of the application using a generic classifier model, the device processor may potentially avoid the costs of obtaining an application-specific classifier model in the event that the generic classifier model is sufficient for classifying the application's behaviors.

The operations of the aspect method 1100 illustrated in FIG. 11 implement some aspects of the operations performed in the method 400. Thus, at least one processor may begin performing the operations of the method 1100 in response to the mobile computing device receiving a binary file for an application in block 402 of method 400 as described above with reference to FIG. 4.

In block 1102, the device processor executing the behavior analyzer unit may obtain a generic classifier model. In some aspects, the device processor executing the behavior analyzer unit may receive the generic classifier model from a server in the form of a full or lean classifier model that is useful in testing/classifying non-specific or "generic" behaviors. For example, the full or lean classifier model may be generated on the server based on information received from multiple mobile computing devices of different types, models, capabilities, functions, features, etc. As such, because the generic classifier model may reflect features or behaviors related to various kinds of mobile computing devices and/or applications, the generic classifier model may be used on various types of mobile computing devices to classify behaviors of various applications.

After receiving the generic classifier model from the device processor executing the behavior analyzer unit, the device processor executing the behavior observer unit may observe behaviors of the application on the mobile computing device related to features included in the generic classifier model in block 1104. In some aspects, the device processor executing the observer unit may perform operations similar to those described with reference to block 410 of method 400 (see FIG. 4). Based on the behaviors observed in block 1104, the device processor executing the behavior analyzer unit may generate a behavior vector for the application in block 1106, such as by performing operations similar to the operations described above with reference to block 412 of method 400 (see FIG. 4).

The device processor executing the behavior analyzer unit may apply the generated behavior vector to the generic classifier model to generate a behavior classification determination and a confidence value associated with the determination in block 1108. As described (e.g., with reference to FIG. 10), applying the generated behavior vector to the generic classifier model may produce a behavior classification determination regarding whether the application's observed behaviors are non-benign (e.g., malicious and/or performance degrading), as well as a confidence value indicating the likelihood that the determination is accurate. For example, the device processor executing the behavior analyzer unit may determine that certain observed behaviors of the application are benign with a low (e.g., 30%) confidence.

In determination block 1110, the device processor executing the behavior analyzer unit may determine whether the confidence value associated with the behavior classification determination generated in block 1108 satisfies a low-confidence threshold, such as by performing operations similar to those described above with reference to determination block 1004 of the method 1000 (see FIG. 10). As described, the low-confidence threshold may be the minimum confidence necessary for a behavior classification determination to have a reasonable or acceptable certainty of being accurate.

In response to determining that the confidence value associated with the behavior classification determination generated in block 1110 satisfies the threshold (e.g., equals or exceeds the low-confidence threshold value) (i.e., determination block 1110="Yes"), the device processor executing the behavior analyzer unit may determine whether applying the generated behavior vector to the generic classifier model indicates the presence of behavior related to the application that is not benign in determination block 1114, such as by performing operations similar to those described with reference to determination block 416 of method 400 (see FIG. 4). In other words, when the behavior classification determination's confidence value is sufficiently high, the device processor executing the behavior analyzer unit may determine whether non-benign behavior related to the application is occurring with a sufficient accuracy in determination block 1114.

In response to determining that the application of the generated behavior vector to the generic classifier model indicates the presence of non-benign behavior (i.e., determination block 1114="Yes"), the device processor executing the actuator unit may terminate the behavior related to the application that is not benign in block 418, such as by performing operations similar to the operations performed in block 418 of method 400 described with reference to FIG. 4.

In response to determining that the application of the generated behavior vector to the generic classifier model does not indicate the presence of non-benign behavior (i.e., determination block 1114="No"), the device processor executing the behavior observer unit may again observe behaviors of the application related to generic features included in the generic classifier model in block 1104 and continue performing the operations of the method 1100 as described.

In response to determining that the confidence value associated with the behavior classification determination generated in block 1108 does not satisfy the threshold (e.g., is not greater than or equal to the low confidence threshold value) (i.e., determination block 1110="No"), the device processor executing the behavior analyzer unit may determine whether there is a consistent history of behavior classification determinations with low confidences that is associated with the generic classifier model in determination block 1112. As described above, a classifier model that is not suitable for monitoring the features of an application may be consistently produce behavioral assessments exhibiting low-confidence values due to the classifier model's inability to test relevant (or highly relevant) behaviors of the application. For example, a mobile computing device utilizing a generic classifier model may produce determinations with low-confidence values because, in order to be effective for various types/models of mobile computing devices, the generic classifier model may test numerous kinds of features that are not especially relevant to a given application running on a given mobile computing device. For example, a generic classifier that includes features related to basic audio playback may be of limited use when classifying the behaviors of a highly specialized, audio-editing application that may have very complex behaviors related to audio playback, recording, editing, etc., and as a result, the generic classifier model may be unable to reliably classify such complex audio behaviors.

As described above (e.g., with reference to FIG. 10), in some aspects, the device processor executing the behavior analyzer unit may determine that there is a consistent history of low-confidence values in response to determining that a certain number of determinations having low-confidence values have occurred within a certain time period. For example, the device processor executing the behavior analyzer unit may determine that there is a consistent history when it is clear that the generic classifier model used to make behavior classification determinations is fundamentally ineffective, compared to an otherwise effective classifier model that occasionally produces determinations with spuriously low confidence values.

In response to determining that there not is a consistent history of behavior classification determinations with low confidences associated with the generic classifier model (i.e., determination block 1112="No"), the device processor executing the behavior observer unit may continue to observe behaviors of the application related to generic features included in the generic classifier model in block 1104, and perform the operations of method 1100 as described above. In other words, even when the generic classifier model classifies behaviors with low confidence values, the device processor may continue to utilize the generic classifier to observe and classify the application's behaviors as long as the generic classifier model is not associated with a consistent history of low-confidence determinations.

In some aspects, in response to determining that there is not a consistent history of determinations with low-confidences associated with the generic classifier model, the device processor executing the behavior observer unit may repeat the operations of method 1100 using a refined generic classifier model because a refined classifier model may yield higher confidence values as described above with reference to FIG. 10.

In response to determining that there is a consistent history of behavior classification determinations with low confidences associated with the generic classifier model (i.e., determination block 1112="Yes"), the device processor executing the behavior observer unit may continue performing operations of method 400 described above with reference to FIG. 4 by performing a light-weight binary analysis of the application's binary file in block 403. In other words, in response to determining that the generic classifier model is not suitable for classifying the application's behaviors (i.e., has a consistence history of low confidence values), the device processor executing the behavior observer unit may obtain a classifier model that is relevant to application-specific features derived from a lightweight binary analysis of the application in an attempt to improve the confidence values of behavior classifications as described above with reference to FIG. 4.

Figure 12:
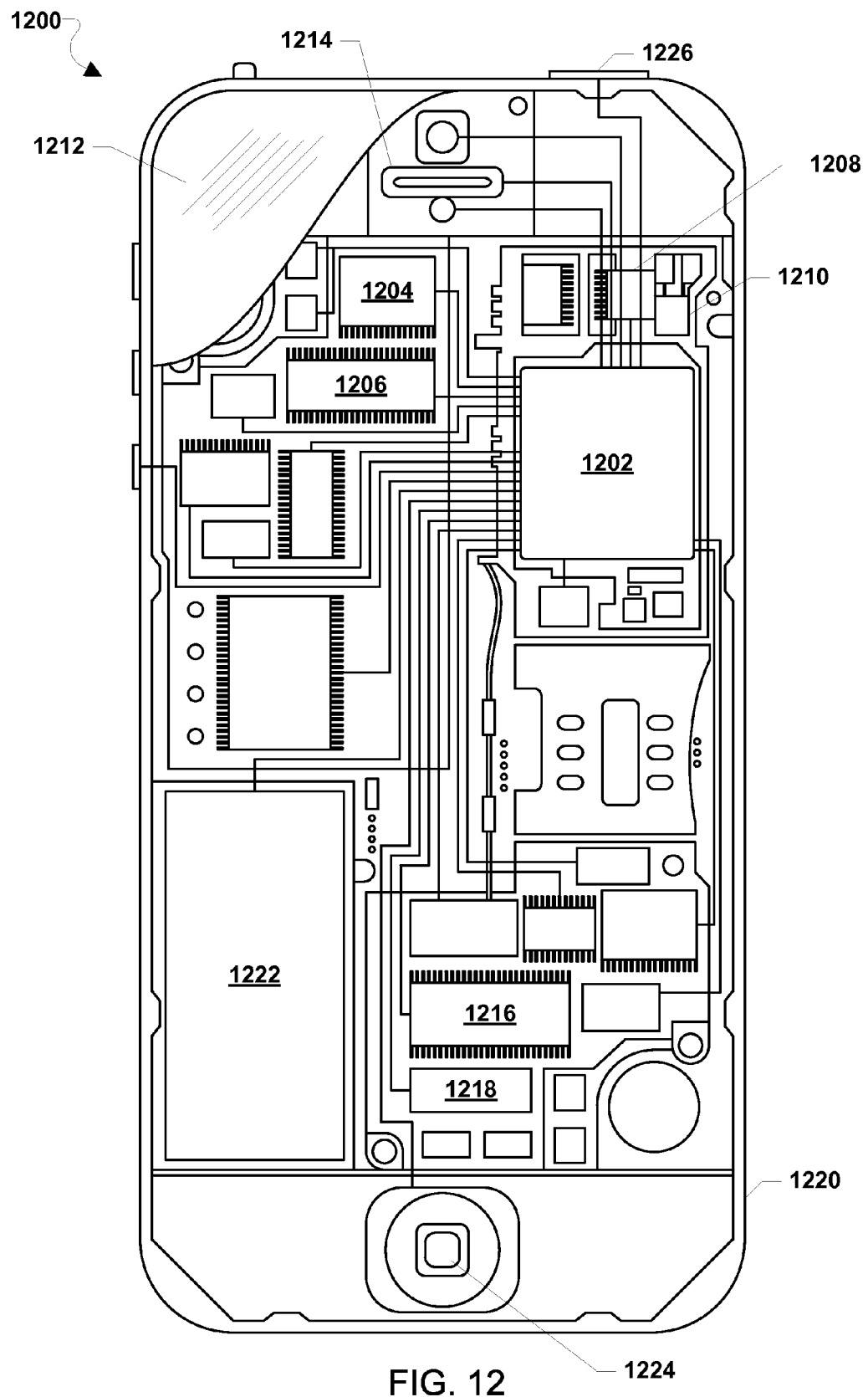
FIG. 12 is a component block diagram of a mobile computing device suitable for use in some aspects.

Various aspects may be implemented in any of a variety of mobile computing devices, an example of which (e.g., mobile computing device 1200) is illustrated in FIG. 12. According to various aspects, the mobile computing device 1200 may be similar to the mobile computing devices 102 as described above with reference to FIGS. 1-3. As such, the mobile computing device 1200 may implement the methods 400, 404*a*, 408*a*-408*c*, 710, 410*a*, 1000, 1100 of FIGS. 4-11.

The mobile computing device 1200 may include a processor 1202 coupled to a touchscreen controller 1204 and an internal memory 1206. The processor 1202 may be one or more multi-core integrated circuits designated for general or specific processing tasks. The internal memory 1206 may be volatile or non-volatile memory, and may also be secure and/or encrypted memory, or unsecure and/or unencrypted memory, or any combination thereof. The touchscreen controller 1204 and the processor 1202 may also be coupled to a touchscreen panel 1212, such as a resistive-sensing touchscreen, capacitive-sensing touchscreen, infrared sensing touchscreen, etc. Additionally, the display of the mobile computing device 1200 need not have touch screen capability.

The mobile computing device 1200 may have a cellular network transceiver 1208 coupled to the processor 1202 and to an antenna 1210 and configured for sending and receiving cellular communications. The transceiver 1208 and the antenna 1210 may be used with the above-mentioned circuitry to implement the various aspect methods. The mobile computing device 1200 may include a Subscriber Identity Module (SIM) card 1216 coupled to the transceiver 1208 and/or the processor 1202 and configured as described above. The mobile computing device 1200 may include a cellular network wireless modem chip 1218 that enables communication via a cellular network and is coupled to the processor.

The mobile computing device 1200 may also include speakers 1214 for providing audio outputs. The mobile computing device 1200 may also include a housing 1220, constructed of a plastic, metal, or a combination of materials, for containing all or some of the components discussed herein. The mobile computing device 1200 may include a power source 1222 coupled to the processor 1202, such as a disposable or rechargeable battery. The rechargeable battery may also be coupled to the peripheral device connection port to receive a charging current from a source external to the mobile computing device 1200. The mobile computing device 1200 may also include a physical button 1224 for receiving user inputs. The mobile computing device 1200 may also include a power button 1226 for turning the mobile computing device 1200 on and off.

Figure 13:
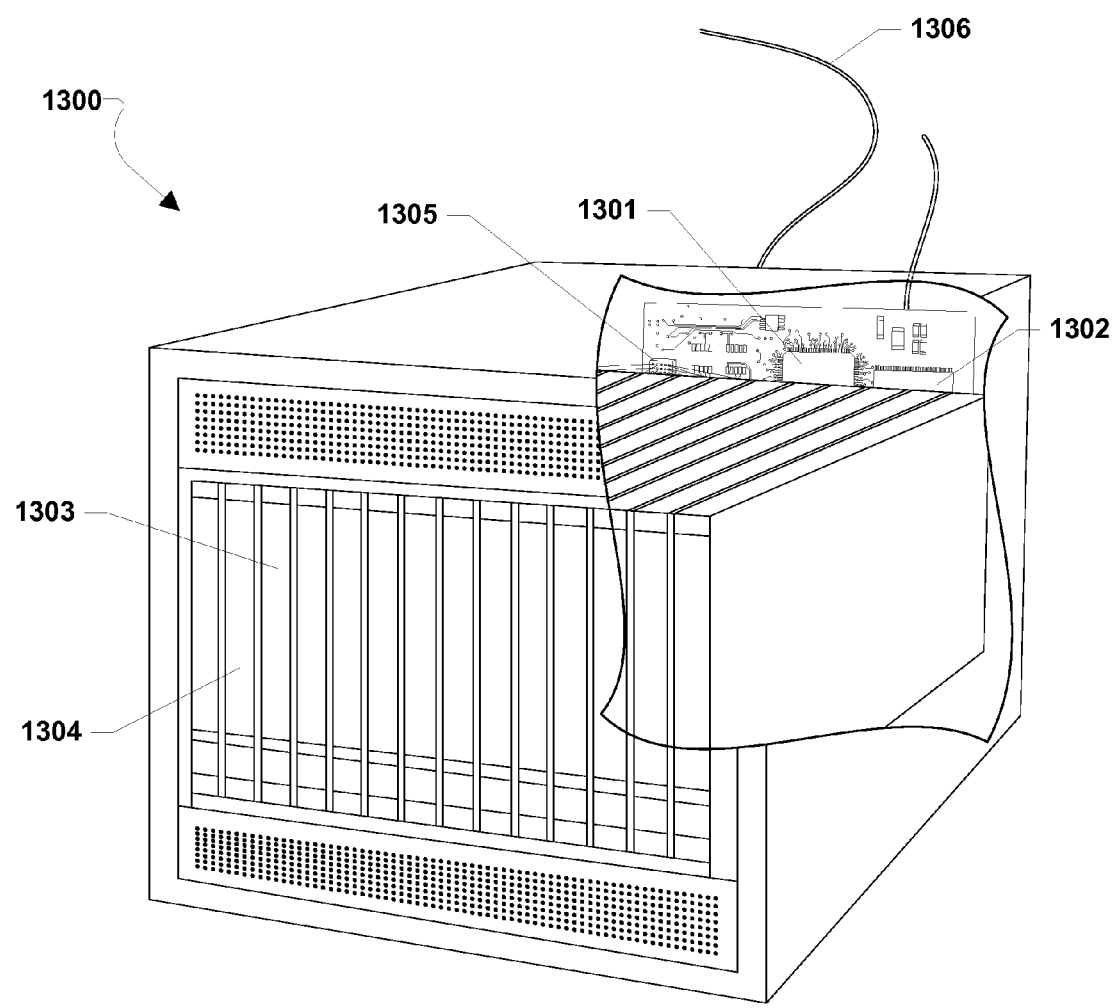
FIG. 13 is a component block diagram of a server device suitable for use in some aspects.

Portions of the aspect methods may be accomplished in a client-server architecture with some of the processing occurring in a server, such as maintaining databases of normal operational behaviors, which may be accessed by a mobile computing device processor while executing the aspect methods. Such aspects may be implemented on any of a variety of commercially available server devices, such as the server 1300 illustrated in FIG. 13. Such a server 1300 typically includes a processor 1301 coupled to volatile memory 1302 and a large capacity nonvolatile memory, such as a disk drive 1303. The server 1300 may also include a floppy disc drive, compact disc (CD) or DVD disc drive 1304 coupled to the processor 1301. The server 1300 may also include network access ports 1305 coupled to the processor 1301 for establishing data connections with a network 1306, such as a local area network coupled to other broadcast system computers and servers. The processor 1301 may be any programmable microprocessor, microcomputer or multiple processor chip or chips that can be configured by software instructions (applications) to perform a variety of functions, including the functions of the various aspects described above. Typically, software applications may be stored in the internal memories 1302, 1303 before they are accessed and loaded into the processor 1301. The processor 1301 may include internal memory sufficient to store the application software instructions.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer-readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android and other general public license (GPL) environments where code that is part of the kernel space must be GPL licensed, while code running in the user-space may not be GPL licensed. It should be understood that the various software components/modules/units discussed here may be implemented in either the kernel space or the user space, unless expressly stated otherwise.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer-readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, units, circuits, and algorithm steps described in connection with the aspects disclosed herein may be implemented as electronic hardware, computer software, or combinations of both. To clearly illustrate this interchangeability of hardware and software, various illustrative components, blocks, modules, units, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, units, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

The functions described in one or more aspects may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of generating and using data models in a mobile computing device, the method comprising:
   performing, via a processor of the mobile computing device, binary analysis operations to derive a set of application-specific features of an application;
   categorizing the application into a category based on the derived set of application-specific features of the application;
   obtaining a classifier model based on the category of the application;
   observing behaviors of the derived set of application-specific features of the application to collect behavior information;
   generating a behavior vector for the application based on the collected behavior information of the application;
   applying the behavior vector to the classifier model to generate an analysis result;
   and detecting a non-benign behavior on the mobile computing device that is related to the application, wherein the detecting is based on the generated analysis result.

2. The method of claim 1, wherein performing the binary analysis operations to derive the set of application-specific features of the application comprises:
   extracting a set of features related to the application based on the binary analysis of the application;
   comparing the extracted set of features with a list of generic features; and
   removing any feature in the set of extracted features that matches a feature in the list of generic features to produce the set of application-specific features.

3. The method of claim 1, wherein categorizing the application into the category based on the derived set of application-specific features comprises:
   classifying behaviors of the application with a generic classifier model;
   determining whether there is a history of behavior classification determinations with low-confidence values associated with the generic classifier model based on the classified behaviors;
   performing the binary analysis operations to derive the set of application-specific features of the application in response to determining that there is a history of behavior classification determinations with low-confidence values associated with the generic classifier model; and
   categorizing the application into the category based on the derived set of application-specific features in response to determining that there is a history of behavior classification determinations with low-confidence values associated with the generic classifier model.

4. The method of claim 1, wherein obtaining the classifier model based on the category of the application comprises:
   comparing the category of the application with a list of categories associated with previously generated classifier models;
   determining whether the category of the application matches any category included in the list of categories;
   obtaining a previously generated classifier model associated with a matching category included in the list of categories in response to determining that the category of the application matches the matching category; and
   obtaining a new classifier model based on the set of application-specific features in response to determining that the category of the application does not match any category in the list of categories.

5. The method of claim 1, further comprising:
   identifying features related to the application that are occurring on the mobile computing device based on the observed behaviors;
   determining whether there is a difference between the features related to the application that are occurring on the mobile computing device and the set of application-specific features included in the classifier model; and
   obtaining a different classifier model based on the features related to the application that are occurring on the mobile computing device in response to determining that there is a difference between the features related to the application that are occurring on the mobile computing device and the set of application-specific features included in the classifier model.

6. The method of claim 1, wherein:
   applying the behavior vector to the classifier model to detect the non-benign behavior on the mobile computing device related to the application comprises applying the behavior vector to the classifier model to generate a behavior classification determination and a confidence value associated with the behavior classification determination; and
   the method further comprises:
      determining whether the confidence value associated with the behavior classification determination is less than a low-confidence threshold value;
      determining whether there is a history of behavior classification determinations with low-confidence values associated with the classifier model in response to determining that the confidence value associated with the behavior classification determination is less than the low-confidence threshold value;

obtaining a refined classifier model associated with the category of the application in response to determining that there is not a history of behavior classification determinations with low-confidence values associated with the classifier model; and performing an analysis of the set of application-specific features to determine a new category for the application and obtaining another classifier model based on the new category of the application in response to determining that there is a history of behavior classification determinations with low-confidence values associated with the classifier model.

7. A mobile computing device, comprising:
a memory; and
a processor coupled to the memory and configured with processor-executable instructions to perform operations comprising:
performing binary analysis operations to derive a set of application-specific features of an application;
categorizing the application into a category based on the derived set of application-specific features of the application; and
obtaining a classifier model based on the category of the application;
observing behaviors of the derived set of application-specific features of the application to collect behavior information;
generating a behavior vector for the application based on the collected behavior information;
applying the behavior vector to the classifier model to generate an analysis result; and
detecting a non-benign behavior on the mobile computing device that is related to the application, wherein the detecting is based on the generated analysis result.

8. The mobile computing device of claim 7, wherein the processor is configured with processor-executable instructions to perform operations such that performing the binary analysis operations to derive the set of application-specific features of the application comprises:
extracting a set of features related to the application based on the binary analysis of the application;
comparing the set of extracted features with a list of generic features; and
removing any feature in the set of extracted features that matches a feature in the list of generic features to produce the set of application-specific features of the application.

9. The mobile computing device of claim 7, wherein the processor is configured with processor-executable instructions to perform operations such that categorizing the application into the category based on the derived set of application-specific features of the application comprises:
classifying behaviors of the application with a generic classifier model;
determining whether there is a history of behavior classification determinations with low-confidence values associated with the generic classifier model based on the classified behaviors;
performing the binary analysis operations to derive the set of application-specific features of the application in response to determining that there is a history of behavior classification determinations with low-confidence values associated with the generic classifier model; and categorizing the application into the category based on the derived set of application-specific features in response to determining that there is a history of behavior classification determinations with low-confidence values associated with the generic classifier model.

10. The mobile computing device of claim 7, wherein the processor is configured with processor-executable instructions to perform operations such that obtaining the classifier model based on the category of the application comprises:
comparing the category of the application with a list of categories associated with previously generated classifier models;
determining whether the category of the application matches a category included in the list of categories;
obtaining a previously generated classifier model associated with any matching category included in the list of categories in response to determining that the category of the application matches the matching category; and
obtaining a new classifier model based on the set of application-specific features in response to determining that the category of the application does not match any category in the list of categories.

11. The mobile computing device of claim 7, wherein the processor is configured with processor-executable instructions to perform operations further comprising:
identifying features related to the application that are occurring on the mobile computing device based on the observed behaviors;
determining whether there is a difference between the features related to the application that are occurring on the mobile computing device and the set of application-specific features included in the classifier model; and
obtaining a different classifier model based on the features related to the application that are occurring on the mobile computing device in response to determining that there is a difference between the features related to the application that are occurring on the mobile computing device and the set of application-specific features included in the classifier model.

12. The mobile computing device of claim 7, wherein:
the processor is configured with processor-executable instructions to perform operations such that applying the behavior vector to the classifier model to detect the non-benign behavior on the mobile computing device related to the application comprises applying the behavior vector to the classifier model to generate a behavior classification determination and a confidence value associated with the behavior classification determination; and
the processor is configured with processor-executable instructions to perform operations further comprising:
determining whether the confidence value associated with the behavior classification determination is less than a low-confidence threshold value;
determining whether there is a history of behavior classification determinations with low-confidence values associated with the classifier model in response to determining that the confidence value associated with the behavior classification determination is less than the low-confidence threshold value;
obtaining a refined classifier model associated with the category of the application in response to determining that there is not a history of behavior classification determinations with low-confidence values associated with the classifier model; and performing an analysis of the set of application-specific features to determine a new category for the application and obtaining another classifier model based on the new category of the application in response to determining that there is a history of behavior classification determinations with low-confidence values associated with the classifier model.

13. A non-transitory computer-readable storage medium having stored thereon processor-executable software instructions configured to cause a processor of a mobile computing device to perform operations comprising:
performing binary analysis operations to derive a set of application-specific features of an application;
categorizing the application into a category based on the derived set of application-specific features of the application;
obtaining a classifier model based on the category of the application;
observing behaviors of the derived set of application-specific features of the application to collect behavior information;
generating a behavior vector for the application based on the collected behavior information;
applying the behavior vector to the classifier model to generate an analysis result; and
detecting a non-benign behavior on the mobile computing device that is related to the application, wherein the detecting is based on the generated analysis result.

14. The non-transitory computer-readable storage medium of claim 13, wherein the stored processor-executable software instructions are configured to cause a processor to perform operations such that performing the binary analysis operations to derive the set of application-specific features of the application comprises:
extracting a set of features related to the application based on the binary analysis of the application;
comparing the set of extracted features with a list of generic features; and
removing any feature in the set of extracted features that matches a feature in the list of generic features to produce the set of application-specific features.

15. The non-transitory computer-readable storage medium of claim 13, wherein the stored processor-executable software instructions are configured to cause a processor to perform operations such that categorizing the application into the category based on the derived set of application-specific features of the application comprises:
classifying behaviors of the application with a generic classifier model;
determining whether there is a history of behavior classification determinations with low-confidence values associated with the generic classifier model based on the classified behaviors;
performing the binary analysis operations to derive the set of application-specific features of the application in response to determining that there is a history of behavior classification determinations with low-confidence values associated with the generic classifier model; and
categorizing the application into the category based on the derived set of application-specific features in response to determining that there is a history of behavior classification determinations with low-confidence values associated with the generic classifier model.

16. The non-transitory computer-readable storage medium of claim 13, wherein the stored processor-executable software instructions are configured to cause a processor to perform operations such that obtaining the classifier model based on the category of the application comprises:
comparing the category of the application with a list of categories associated with previously generated classifier models;
determining whether the category of the application matches any category included in the list of categories;
obtaining a previously generated classifier model associated with a matching category included in the list of categories in response to determining that the category of the application matches the matching category; and
obtaining a new classifier model based on the set of application-specific features in response to determining that the category of the application does not match any category in the list of categories.

17. The non-transitory computer-readable storage medium of claim 13, wherein the stored processor-executable software instructions are configured to cause a processor to perform operations further comprising:
identifying features related to the application that are occurring on the mobile computing device based on the observed behaviors;
determining whether there is a difference between the features related to the application that are occurring on the mobile computing device and the set of application-specific features included in the classifier model; and
obtaining a different classifier model based on the features related to the application that are occurring on the mobile computing device in response to determining that there is a difference between the features related to the application that are occurring on the mobile computing device and the set of application-specific features included in the classifier model.

18. The non-transitory computer-readable storage medium of claim 13, wherein the stored processor-executable software instructions are configured to cause a processor to perform operations further comprising:
determining a confidence value associated with a behavior classification determination;
determining whether the confidence value associated with the behavior classification determination is less than a low-confidence threshold value;
determining whether there is a history of behavior classification determinations with low-confidence values associated with the classifier model in response to determining that the confidence value associated with the behavior classification determination is less than the low-confidence threshold value;
obtaining a refined classifier model associated with the category of the application in response to determining that there is not a history of behavior classification determinations with low-confidence values associated with the classifier model;
performing an analysis of the set of application-specific features to determine a new category for the application and obtaining another classifier model based on the new category of the application in response to determining that there is a history of behavior classification determinations with low-confidence values associated with the classifier model.

* * * * *